(12) United States Patent
Rastogi et al.

(10) Patent No.: US 11,048,864 B2
(45) Date of Patent: Jun. 29, 2021

(54) DIGITAL ANNOTATION AND DIGITAL CONTENT LINKING TECHNIQUES

(71) Applicant: Adobe Inc., San Jose, CA (US)

(72) Inventors: Mudit Rastogi, Kanpur (IN); Souvik Sinha Deb, Noida (IN); Prakhar Mehrotra, Kanpur (IN); Gaurav T. Kakkar, Hoshiarpur (IN); Damanpreet Kaur, Jalandhar (IN); Abhinav Kaushik, Shahadara (IN); Anshul Jain, Meerut (IN); Abhinav Agarwal, Noida (IN)

(73) Assignee: Adobe Inc., San Jose, CA (US)

( * ) Notice: Subject to any disclaimer, the term of this patent is extended or adjusted under 35 U.S.C. 154(b) by 17 days.

(21) Appl. No.: 16/372,037

(22) Filed: Apr. 1, 2019

(65) Prior Publication Data
US 2020/0311190 A1  Oct. 1, 2020

(51) Int. Cl.
G06F 40/169 (2020.01)
G06F 40/114 (2020.01)
G06F 40/137 (2020.01)

(52) U.S. Cl.
CPC .......... *G06F 40/169* (2020.01); *G06F 40/114* (2020.01); *G06F 40/137* (2020.01)

(58) Field of Classification Search
None
See application file for complete search history.

(56) References Cited

U.S. PATENT DOCUMENTS

| | | | | |
|---|---|---|---|---|
| 5,581,682 A * | 12/1996 | Anderson | ............ | G06F 40/169 715/236 |
| 6,336,124 B1 * | 1/2002 | Alam | .................... | G06F 40/258 715/205 |
| 7,689,578 B2 * | 3/2010 | Albornoz | ............ | G06F 40/197 715/230 |
| 7,814,417 B2 * | 10/2010 | Tomita | .................. | G06F 3/1284 715/273 |
| 8,201,079 B2 * | 6/2012 | Cragun | ................ | G06F 40/169 715/230 |
| 9,262,390 B2 * | 2/2016 | Edala | ....................... | G06F 16/35 |
| 9,275,368 B1 * | 3/2016 | Harpalani | ............. | G06Q 10/10 |
| 9,870,351 B2 * | 1/2018 | Emanuel | ............... | G06F 40/169 |
| 9,880,989 B1 * | 1/2018 | Cadabam | ............ | G06F 40/103 |
| 10,007,650 B2 * | 6/2018 | Edala | ...................... | G06F 16/94 |
| 10,140,263 B2 * | 11/2018 | Gagne-Langevin | | G06F 40/186 |
| 10,380,235 B2 * | 8/2019 | Bhatt | .................... | G06F 40/169 |
| 10,402,486 B2 * | 9/2019 | Kerr | ...................... | G06F 40/103 |
| 10,437,931 B1 * | 10/2019 | Matskevich | .......... | G06F 40/284 |
| 10,452,770 B2 * | 10/2019 | Maglieri | .............. | G06Q 10/101 |

(Continued)

*Primary Examiner* — Scott T Baderman
*Assistant Examiner* — Benjamin Smith
(74) *Attorney, Agent, or Firm* — FIG. 1 Patents

(57) ABSTRACT

Digital annotation and digital content linking techniques implemented by digital content generation system as part of a computing device are described. The system is configured to convert a digital document including an object from a first format to a second format, receiving the digital document in the second format with an annotation associated with the object, converting the digital document in the second format with the annotation associated with the object to the first format, and maintaining the association between the annotation and the object subsequent to an alteration in a page sequence of the document in the first format, or movement of the object.

20 Claims, 18 Drawing Sheets

(56) References Cited

U.S. PATENT DOCUMENTS

| | | | | |
|---|---|---|---|---|
| 10,460,023 B1* | 10/2019 | Shriver | ............... | G06F 40/14 |
| 2004/0194021 A1* | 9/2004 | Marshall | ............... | G06F 40/169 |
| | | | | 715/232 |
| 2005/0108630 A1* | 5/2005 | Wasson | ............... | G06F 16/313 |
| | | | | 715/230 |
| 2005/0160355 A1* | 7/2005 | Cragun | ............... | G06F 40/169 |
| | | | | 715/230 |
| 2005/0160356 A1* | 7/2005 | Albornoz | ............... | G06F 40/197 |
| | | | | 715/229 |
| 2005/0165852 A1* | 7/2005 | Albornoz | ............... | G06F 16/907 |
| 2006/0061595 A1* | 3/2006 | Goede | ............... | G06T 11/60 |
| | | | | 345/619 |
| 2006/0075339 A1* | 4/2006 | Tomita | ............... | G06F 3/125 |
| | | | | 715/255 |
| 2007/0174761 A1* | 7/2007 | Lin | ............... | G06F 40/169 |
| | | | | 715/205 |
| 2008/0236904 A1* | 10/2008 | Zukowski | ............... | G06F 40/169 |
| | | | | 178/18.03 |
| 2009/0327873 A1* | 12/2009 | Cairns | ............... | G06F 40/169 |
| | | | | 715/249 |
| 2012/0060082 A1* | 3/2012 | Edala | ............... | G06F 16/36 |
| | | | | 715/231 |
| 2014/0006919 A1* | 1/2014 | He | ............... | G06F 40/169 |
| | | | | 715/230 |
| 2014/0115436 A1* | 4/2014 | Beaver | ............... | G06F 40/169 |
| | | | | 715/229 |
| 2014/0222853 A1* | 8/2014 | Massand | ............... | G06F 16/951 |
| | | | | 707/758 |
| 2015/0248390 A1* | 9/2015 | Gormish | ............... | G06K 9/00402 |
| | | | | 715/233 |
| 2016/0048987 A1* | 2/2016 | Sevenster | ............... | G06T 7/38 |
| | | | | 715/232 |
| 2016/0092422 A1* | 3/2016 | Maglieri | ............... | G06Q 10/101 |
| | | | | 715/751 |
| 2016/0132479 A1* | 5/2016 | Edala | ............... | G06F 16/907 |
| | | | | 715/230 |
| 2017/0060829 A1* | 3/2017 | Bhatt | ............... | G06F 40/134 |
| 2017/0091162 A1* | 3/2017 | Emanuel | ............... | G06F 40/169 |
| 2017/0116179 A1* | 4/2017 | Gagne-Langevin | ............... | G06F 40/226 |
| 2017/0185569 A1* | 6/2017 | Gagne-Langevin | ............... | G06F 40/177 |
| 2018/0232348 A1* | 8/2018 | Kerr | ............... | G06F 40/103 |
| 2019/0162550 A1* | 5/2019 | Rao | ............... | G06F 40/169 |
| 2019/0251142 A1* | 8/2019 | Gagne-Langevin | ............... | G06F 40/117 |
| 2019/0294660 A1* | 9/2019 | DeVoe | ............... | G06F 40/171 |
| 2019/0294665 A1* | 9/2019 | Matskevich | ............... | G06F 40/279 |
| 2019/0294672 A1* | 9/2019 | Matskevich | ............... | G06F 40/268 |
| 2019/0354579 A1* | 11/2019 | Kerr | ............... | G06F 40/134 |
| 2020/0175106 A1* | 6/2020 | Biddle | ............... | G06F 40/169 |
| 2020/0293607 A1* | 9/2020 | Nelson | ............... | G06F 40/30 |

* cited by examiner

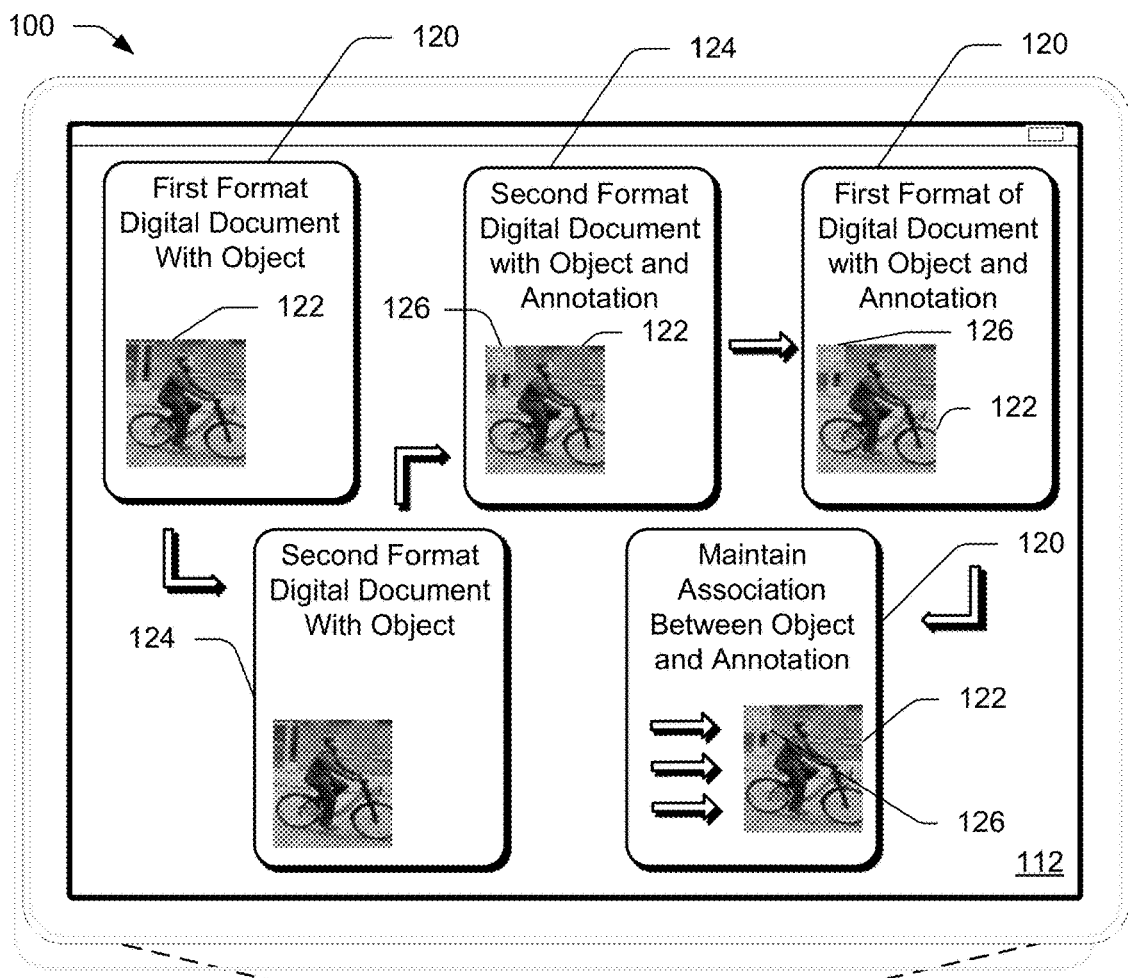
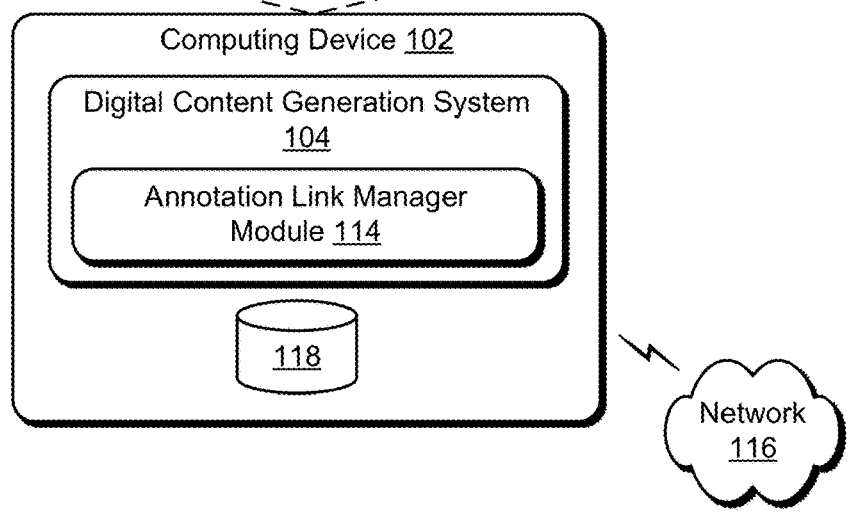
Fig. 1

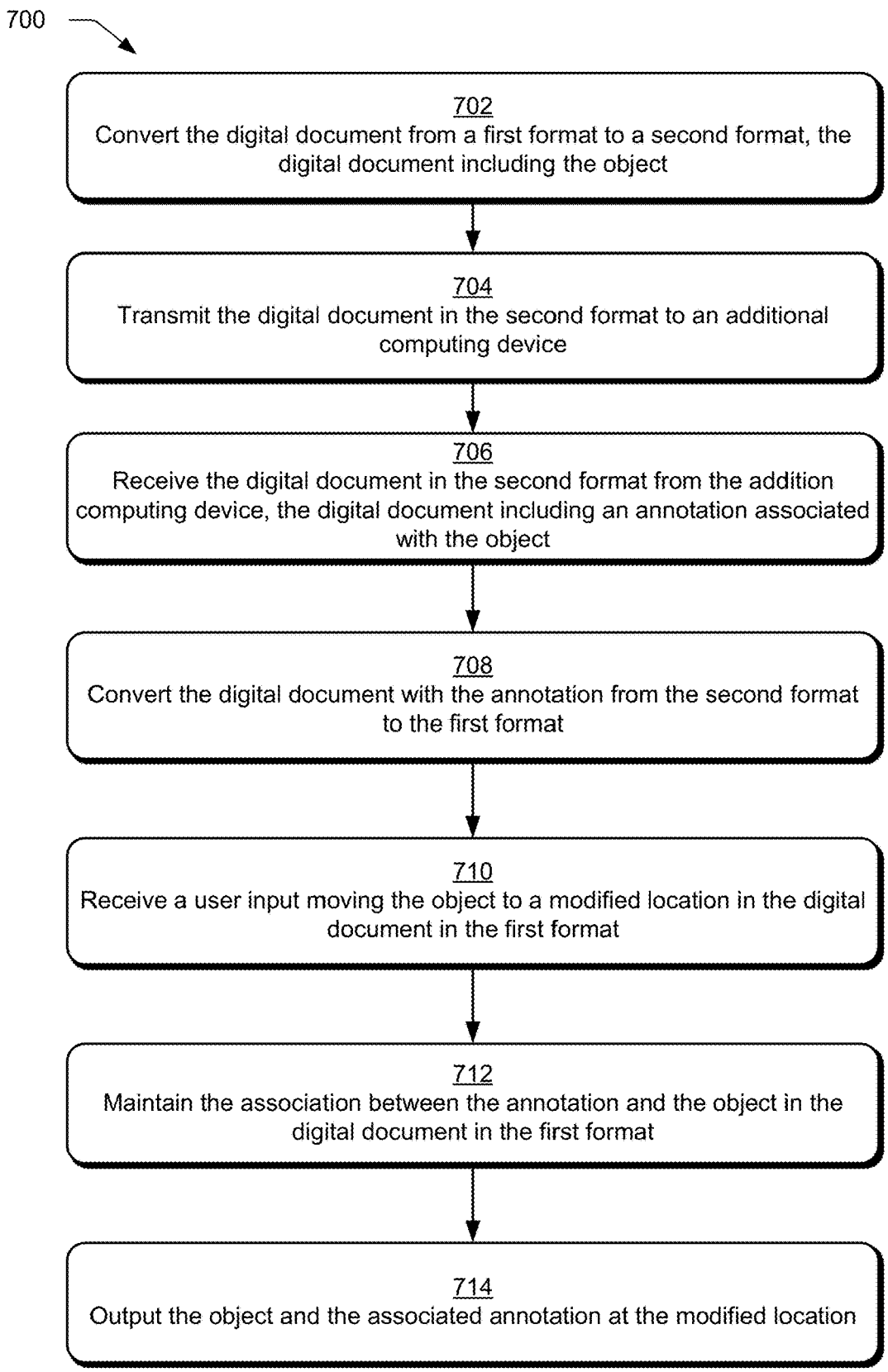

DIGITAL ANNOTATION AND DIGITAL CONTENT LINKING TECHNIQUES

BACKGROUND

Digital content generation systems include digital design and editing tools that enable content creators and content reviewers to collaborate to improve the quality and appearance of digital content. Such collaboration is performed via tools presented in a variety of visual guides and panels with which content creators and reviewers interact via, e.g., a user interface. A content creator may generate digital content, receive corrections or comments from one or more reviewers, and edit the content based on these comments. This process—loosely termed content creation workflow—has several drawbacks.

Content creators must track and incorporate comments received from one or more reviewers separately, which is time consuming, error prone, and inefficient. Additionally, the comments from reviewers may be provided as part of a file format that varies from the file format in which the digital content was originally generated. As a result, content creators are often required to convert the file format of the digital content that contains the reviewers comments to another format prior to making changes. This required conversion introduces workflow inefficiencies and errors. For example, after conversion of the file format, the content creator must manually confirm that the reviewer's comments are incorporated or applied onto the correct object or portion of the originally rendered digital content. As a result, certain comments are omitted or misplaced after the conversion. Due to the various comment types, the number of reviewers, and complexity of the generated digital content, such errors are inevitable.

Conventional systems attempt to mitigate some of the above problems with, for example, features that enable the import of comments from one file format to another. Such features fail to address the problems of the content creation workflow process. Specifically, these features fail to correctly map the reviewer's comments to the appropriate page once the file format of the digital content is converted. Conventional comment importing features also fail to adequately link the comments to portions of the digital content, e.g. adequately link the comment to an object, color, etc., such that the comment remains linked to an object even after the content creators modify the object's location within the digital content. In other words, moving the object within the digital content severs the connection between the object and comment, inevitably leading to the content creator editing the wrong object, entirely omitting to make certain recommended changes, or incorrectly applying reviewer recommendations to an object.

Finally, conventional systems are limited in the format of comments that reviewers are allowed to generate and import. Reviewers may, for example, choose to include comments in free-form diagrams—shapes, configurations, etc. that are based on a reviewer's unique style of conveying a comment or suggestion. For example, a reviewer might choose to render a triangle, trapezoid, or polygon with uneven sides onto one or more objects in the digital content and incorporate text or other shapes within the triangle or trapezoid to best convey certain changes. But conventional systems do not support reviewer comments in such forms and fail to import such comments after the digital content's file format is converted. All of these limitations inhibit user creativity and introduce inefficiencies in the digital content creation process, making the process cumbersome and error prone.

SUMMARY

A digital content generation system, implemented via a computing device, enables inclusion of annotations in a variety of styles, shapes, and configurations, and accurately imports comments included by a reviewer provided from a particular file format onto another format, thereby reducing errors in digital content editing, and improving the overall digital content generation process. In operation, the digital content generation system described herein converts, using a computing device, digital content generated by a content creator, e.g. a digital document, from a first format to a second format. The digital document may include a variety of objects, colors, designs, etc., originally generated by a content creator. The system transmits the digital document in the second format to an additional computing device. A digital content reviewer may then use the additional computing device to include one or more annotations associated with one or more objects included in the digital document in the second format. The annotations may be comments, suggestions, or recommended edits that can be included in a variety of ways—text comments, free-form diagrams, text call out options, etc. After the annotations are associated with the objects, the digital document in the second format (with the annotations), is received by the computing device. From this, the computing device converts the digital document with the annotations associated with objects from the second format to the first format.

Upon conversion, the digital content generation system accurately imports the annotations from the second format onto the first format such that the associations between the objects and the annotations are maintained. Moreover, the association between objects and annotations are maintained even after movement, using the computing device, of the object to a modified location within the digital document.

In this way, the digital content generation system described herein addresses and overcomes the limitations present in conventional systems. Specifically, the digital content generation system accurately maps the annotation associated with the object onto the appropriate page of the digital document in the first format, and links the annotation with the object such that the association between objects and annotations are maintained after any change in the object's location. Finally, the digital content generation system also supports and accurately imports annotations in a variety of shapes and configurations, including, e.g. free-form diagrams. In this way, the system enables the content reviewers to effectively convey edit recommendations. Errors in the digital content design process are reduced by the digital content generation system described herein.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

FIG. 1 is an illustration of a digital content generating environment including a digital content generation system configured to accurately import annotations associated with objects from a second format to a first format and maintain the associations between the annotations and objects subsequent to any change in the location of the objects in the first format.

FIG. 4F depicts the result of the page sequence change of the digital document in the first format. As depicted, the association between the object and the annotation is maintained after the page on which both appeared changed from first format page 1 to first format page 6.

FIG. 7 is a flow diagram depicting an example procedure to correctly import annotations from one format to another format and maintain associations between objects and annotations subsequent to movement in the location of the object within the digital document in the first format.

DETAILED DESCRIPTION

Overview

Figure 2:
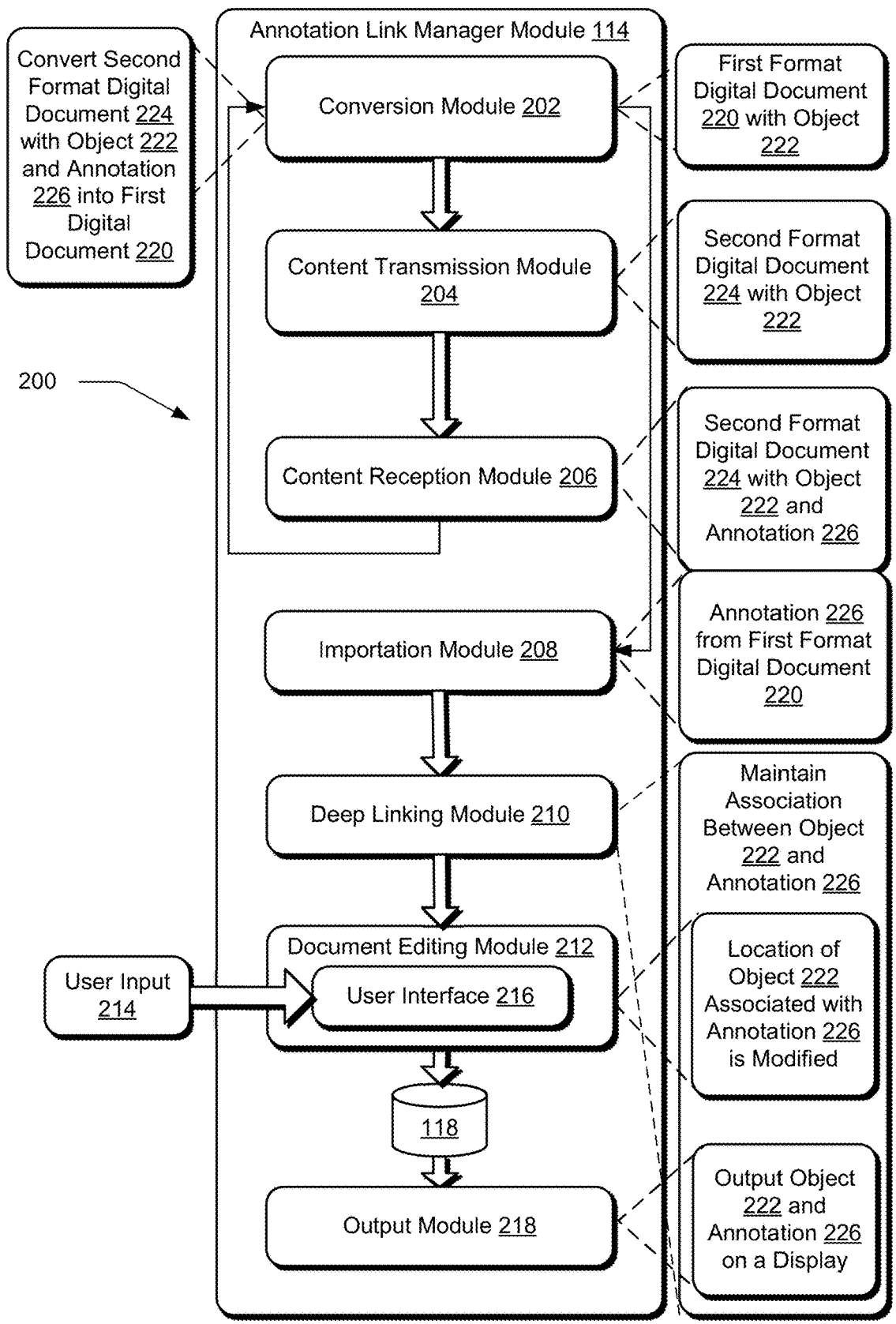
FIG. 2 depicts an example operation of the digital content generation system that includes a conversion module, a content transmission module, a content reception module, an importation module, a deep linking module, a document editing module, and an output module in greater detail to support digital content and digital annotation linking techniques.

Conventional digital content generation system suffer from numerous limitations. These systems require content creators to manually track comments received from one or more reviewers in one format of a digital document and match the comments to corresponding portions within the digital document in another format. Content creators are often required to assess and compare two different file formats of the digital document simultaneously in order to incorporate the changes recommended by a content reviewer. Consequently, errors and inefficiencies in the digital content design process are introduced.

Some conventional digital content generation systems mitigate these inefficiencies by enabling the importation of annotations from one format to another. However, the importation feature fails to address the problems present in conventional digital content generation techniques. These systems fail to (1) appropriately map an object and its associated annotation onto the appropriate page within a digital document after the document's file format is converted, (2) adequately link annotations with objects within a digital document such that the object-annotation link is maintained after any change in the object's location within the digital document, or (3) facilitate a wide range of annotation styles that enables content reviewers to easily and effectively convey recommendations to content creators. Even if an annotation were accurately imported after document conversion, any change in the object's location severs the object-annotation association. As such, the content creator is required to manually track the location of both the object and its associated annotation, leading to digital design errors and delays.

To overcome these problems with conventional digital content generation techniques, a digital content generation system is described herein that supports digital annotation linking techniques within digital documents. The system accurately and seamlessly imports annotations associated within objects from one format to another format, and maintains associations between objects and annotations after movement of the objects. In one example operation, a conversion module is configured to convert a digital document that includes an object from a first format to a second format. The object may be, e.g. images, line segments, vector art, etc.

From this, a content transmission module transmits the digital document in the second format to an additional computing device. At the additional computing device an annotation is included as part of the digital document in the second format, e.g. the annotation is associated with an object in the digital document, and the digital document in the second format with the annotation is received by the computing device. From this, the conversion module converts the format of the digital document with the annotation from a second format back to the first format. After conversion to the first format, an importation module of the digital content generation system described herein addresses a limitation of conventional systems by accurately importing the annotation(s) associated with the object(s) into the digital document in the first format.

Specifically, the importation module imports the annotation from the digital document in the second format to an appropriate page of the digital document in the first format. Moreover, a deep linking module of the digital content generation system maintains the association between the annotation and the object in the digital document in the first format even if the page sequence of the digital document is modified in some way. If, for example, the page on which the object and its associated annotation is located is moved from the beginning to the end of the digital document, the object-annotation association is nonetheless maintained. In another example, if either the object or its associated annotation is moved within the page, the deep linking module maintains the object-annotation association.

In this way, the digital content generation system addresses the limitation of conventional digital content generation systems. Specifically, the system described herein (1) appropriately maps an object and its associated annotation onto an appropriate page within a digital document after the document's file format has been converted, (2) links annotations with objects within a digital document such that the object-annotation link is maintained even with a change in the digital document's page sequence or a movement of the object within a page in the document, and (3) supports the import of a wide range of annotation styles, including freeform based annotations, that enables content reviewers to easily and effectively convey recommendations to content creators.

In the following discussion, an example environment is described that may employ techniques and processes included in the digital content generation system described herein. Example procedures are also described which may be performed in the example environment as well as other environments. Consequently, performance of the example procedures is not limited to the example environment and the example environment is not limited to the performance of the example procedures.

Term Descriptions

As described herein, "format" or "file format" defines the structure and data type that is included as part of a file. The structure of a file may include a header, metadata, saved content, and an end-of-file marker of some kind and data types could include, e.g. plain text or binary format. Examples of file format include XML, PDF, JPEG, .ZIP, InDesign, etc.

As described herein, "digital annotation" refers to a type of digital comment, digital suggestion, or some form of digital input that appears on or near one or more objects within digital content in a particular file format, e.g. PDF. Digital annotations take the form of a path comment, a point comment, or a text range comment.

As described herein, "object" refers to images, shapes, colors, or a combination of one or more of these included within digital content.

As described herein, "path comment" refers to a drawing that appears on or adjacent to one or more objects in digital content. This drawing can take the form of a sticky note, a line segment, a stamp, connected lines, text boxes, a freeform drawing that appears on or near an object in digital content, and various geometric shapes—oval, rectangle, polygon etc.

As described herein, "point comment" refers to a drawing that serves to identify, with precision, a particular portion of digital content. The point comment can take the form of an arrow shaped indicator identifying an object in digital content, or text callout box or text based call-out feature, e.g. text that appears within a rectangular (or similarly shaped) box that may be placed within digital content. The text callout or text box can be resized or moved within digital content.

As described herein, "text range comment" refers to features that enable highlighting, underlining, striking through, replacing, and/or inserting text.

In the following discussion, an example environment is described that may employ techniques and processes included in the digital content generation system described herein. Example procedures are also described which may be performed in the example environment as well as other environments. Consequently, performance of the example procedures is not limited to the example environment and the example environment is not limited to the performance of the example procedures.

Example System and Device

FIG. 1 is an illustration of a digital content generating environment 100 in which the digital annotation and content linking techniques described herein are employed. The environment 100 includes computing device 102 that implements digital content generation system 104. The environment 100 illustrates example operation of digital content generation system 104 as implemented by computing device 102.

The computing device 102, for instance, may be configured as a desktop computer, a laptop computer, a mobile device, e.g. assuming a handheld configuration such as a tablet or mobile phone as illustrated, and so forth. Thus, the computing device 102 may range from full resource devices with substantial memory and processor resources 118 (e.g. personal computers, game consoles) to a low-resource device with limited memory and/or processing resources (e.g. mobile device). Computing device 102 can constitute a single computing device or a plurality of different devices, such as multiple servers utilized by a business to perform operations "over the cloud" as described in FIG. 8. Additionally, although illustrated as implemented locally at computing device 102, functionality of digital content generation system 104 may also be implemented as whole or part via functionality available via the network 116, such as part of web service or "in the cloud," as described in FIG. 8.

As previously stated, conventional digital content generation systems have several drawbacks. These systems require digital content creators to manually track comments received from one or more reviewers in one format of the digital document and match the comments to corresponding portions within the same document after the document has been converted to another format. This process introduces errors and creates inefficiencies in the digital content design process. While conventional systems partially mitigate some of these problems with the use of a comment or annotation importation feature, this feature cannot (1) map annotations onto appropriate pages within a digital document, (2) adequately maintain object-annotation associations despite changes in the location of the object, or (3) enable use of a wide range of annotation styles that enable effective communication of recommendations by content creators.

Digital content generation system 104 addresses these challenges as depicted in the processes shown in FIG. 1. In one example, the digital content generation system 104 is implemented at least partially in hardware of computing device 102. In operation, the annotation link manager module 114 first converts a first format digital document 120 including an object 122 into a second format digital document 124, and transmits the converted document to an additional computing device. Thereafter, at the additional computing device, an annotation 126 is associated with the object included in the second format digital document 124—shown by a marker on the top left portion of the image of an individual riding a bicycle. The digital document in the second format 124 with the included annotation 126 is then received by the computing device 102 and converted back into a first format digital document 120. Upon conversion, digital content generation system 104 appropriately maps the object 122 with its associated annotation 126 onto an appropriate page within the first format digital document 120, thereby addressing a deficiency present in conventional systems. Moreover, as shown FIG. 1, the association between the object 122 and the annotation 126 is maintained even after the object 122 is moved horizontally on a page within first format digital document 120. In other words, the annotation associated with the object appears on the same location on object 122 even when object 122 is moved to another location within the page. In this way, the digital content generation system 104 addresses the deficiencies and drawbacks present in conventional systems.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Annotation and Digital Content Linking Techniques

Figure 3:
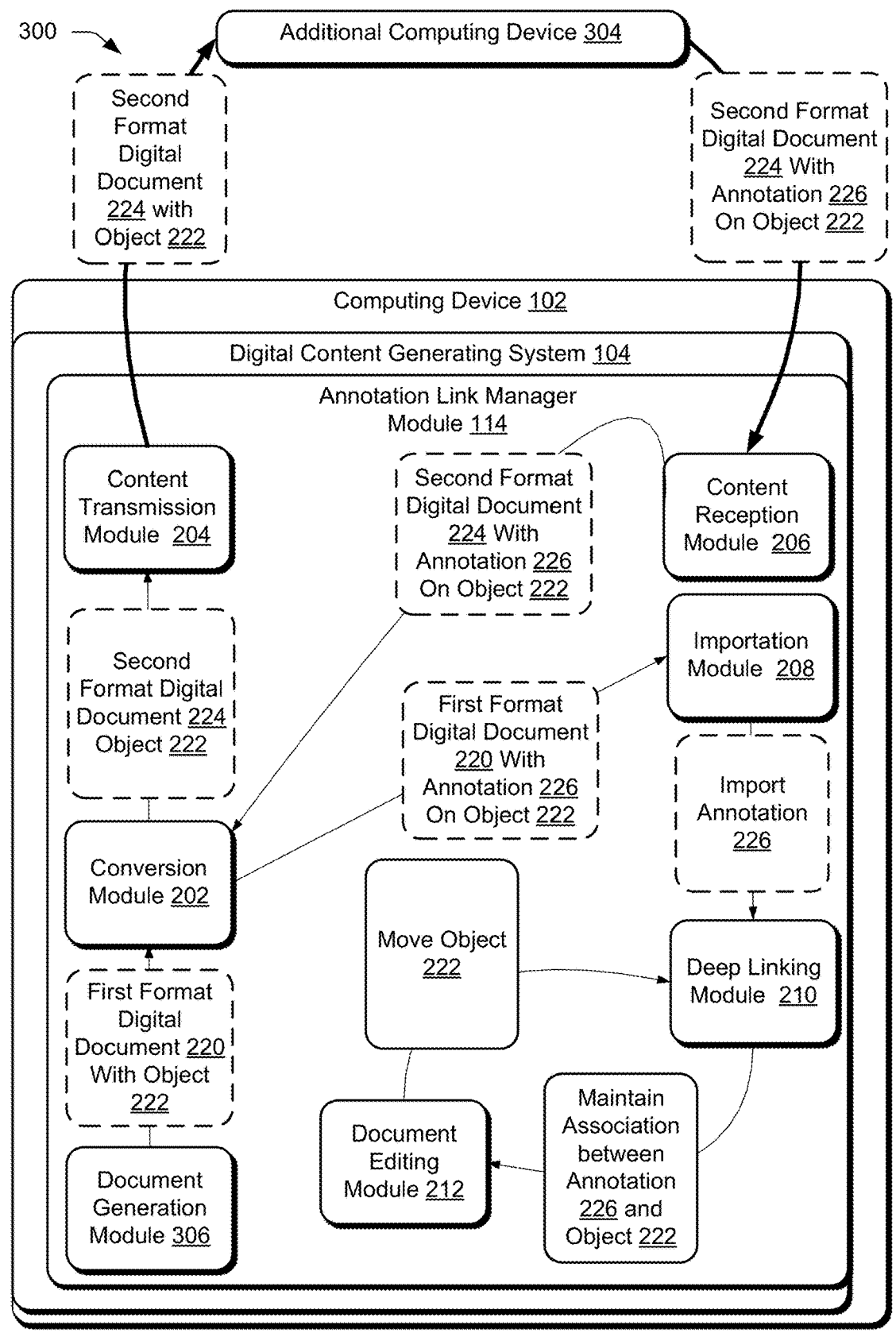
FIG. 3 depicts an example operation of the digital content generation system detailing the interaction between a document generation module, the conversion module, a content transmission module, a content reception module, an importation module, a deep linking module, a document editing module, and an output module in greater detail to support digital content and digital annotation linking techniques.

FIG. 2 depicts a system 200 in an example operation of the annotation link manager module 114 of digital content generation system 104. FIG. 3 depicts the example operation of the annotation link manager module 114 as part of digital content generation system 104 interacting with an additional computing device or additional computing device. FIG. 7 depicts procedure 700 in an example of the digital content generation system 104 performing digital annotation and digital content linking techniques described herein. Aspects of the procedure 700 may be implemented in hardware, firmware, software, or a combination thereof. The procedure 700 is shown as a set of blocks that specify operations performed by one or more devices and are not necessarily limited to the orders shown for performing the operations by the respective blocks. In the following discussion, reference is made interchangeably to FIGS. 1-7.

FIGS. 4A-4F depicts example operation 400 of digital content generation system being performed by the modules depicted in FIGS. 2 and 3. Example operation 400 is shown in first, second, third, fourth, fifth, sixth, and seventh stages 402, 404, 406, 408, 410, 412, and 414 as applicable to FIGS. 4A-4F. At first stage 402, a document generation module 306 generates a first format digital document 220 with object 222. The page sequence within first format digital document 220 is also depicted. The object 222 is an image of an individual riding a bicycle. At second stage 404, a conversion module 202 of digital content generation system 104 converts the first format digital document 220 with object 222 into a second format digital document 224 with object 222, e.g. PDF format (block 702). Then, content transmission module 204 transmits the second format digital document 224 with object 222 to an additional computing device 304 (block 704), as depicted in FIG. 3.

As part of the transmission of the second format digital document 224, various numeric identifiers are exported to the additional computing device 304, included in a predefined key associated with the second format digital document 224. This predefined key includes metadata associated with both the first format digital document 220 and second format digital document 224. Specifically, in the described example operation, an original document identifier that identifies the first format digital document 220 is exported as part of a predefined key. The original format document identifier (i.e. first format document identifier) is stored by the conversion module 202 within computing device 102 upon converting the first format digital document 220 into second format digital document 224. Additionally, a page identifier array that includes page identifiers associated with each page within the second format digital document, e.g. PDF document is also exported. It is also noted that each page of the second format digital document may correspond with one or multiple pages of the first format digital document. Finally, a page width array identifying the width measurements of each page of the first format digital document is also exported as part of the predefined key.

Thereafter, at third stage 406, an annotation 226 is associated with object 222 included in second format digital document 224 and the second format digital document 224 is then received by content reception module 206 (block 706) of computing device 102 from additional computing device 304, as depicted in FIG. 3. While transmission to and reception from an additional computing device is discussed, associating annotation 226 with object 222 may be performed within or using computing device 102, or via the cloud.

Figure 4A:
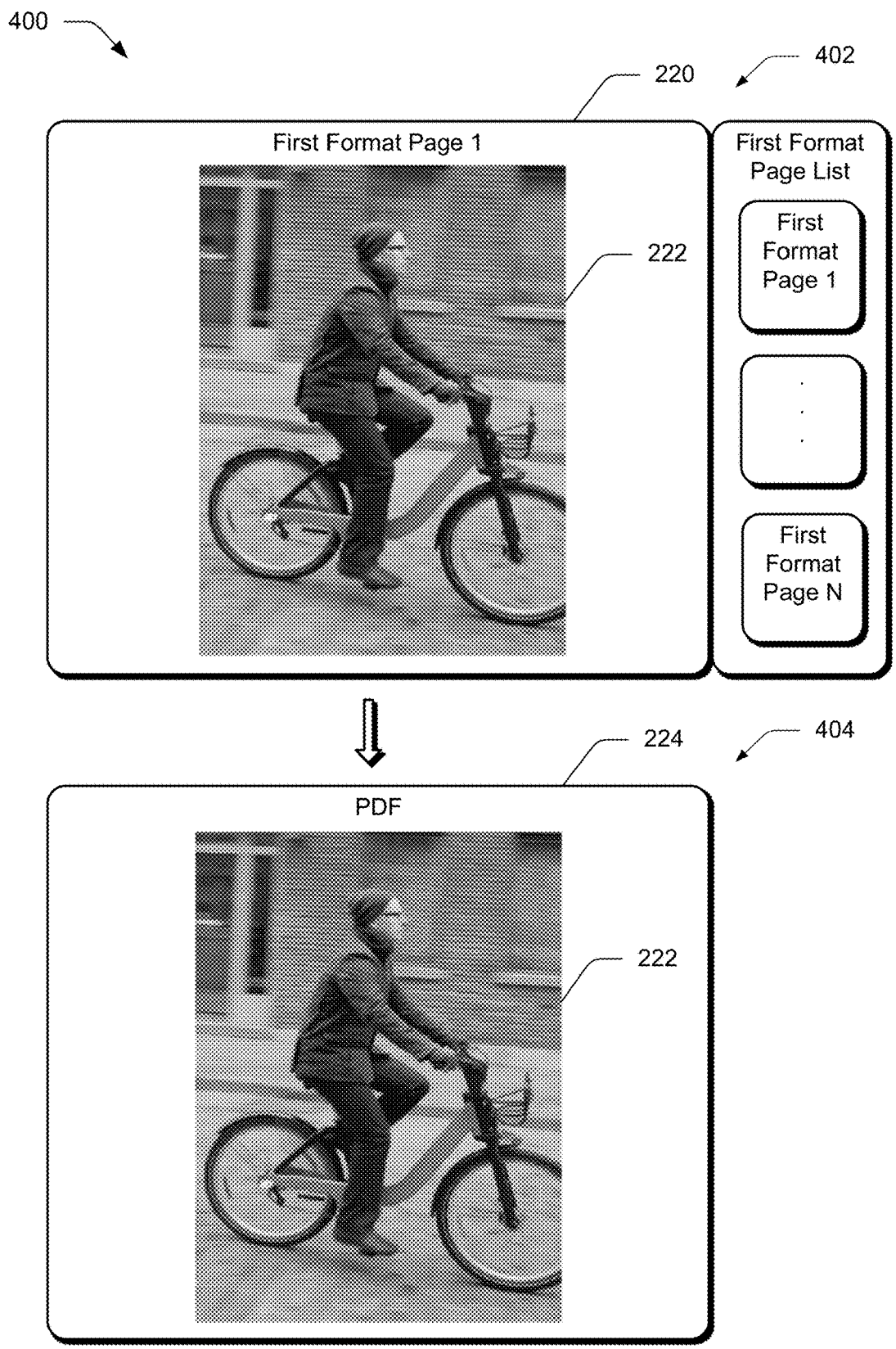
FIG. 4A depicts the digital content generation system converting, using a computing device, a digital document including an object, e.g. an image of an individual riding a bike, from a first format to a second format, e.g. the Portable Document Format (PDF) format.
Figure 4B:
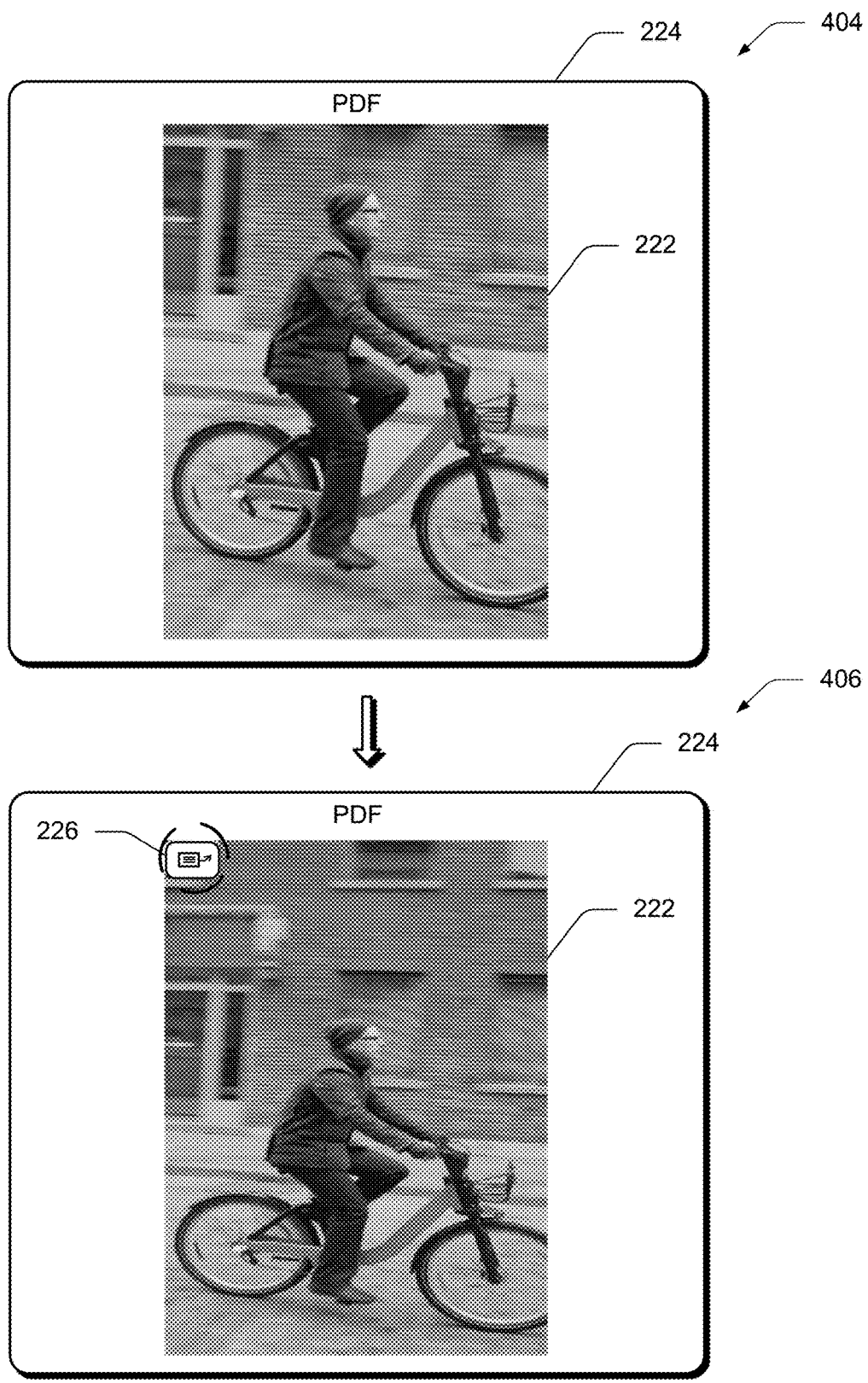
FIG. 4B depicts the inclusion of an annotation associated with the object in the digital document in the second format. The top-left corner of the document includes the annotation.
Figure 4C:
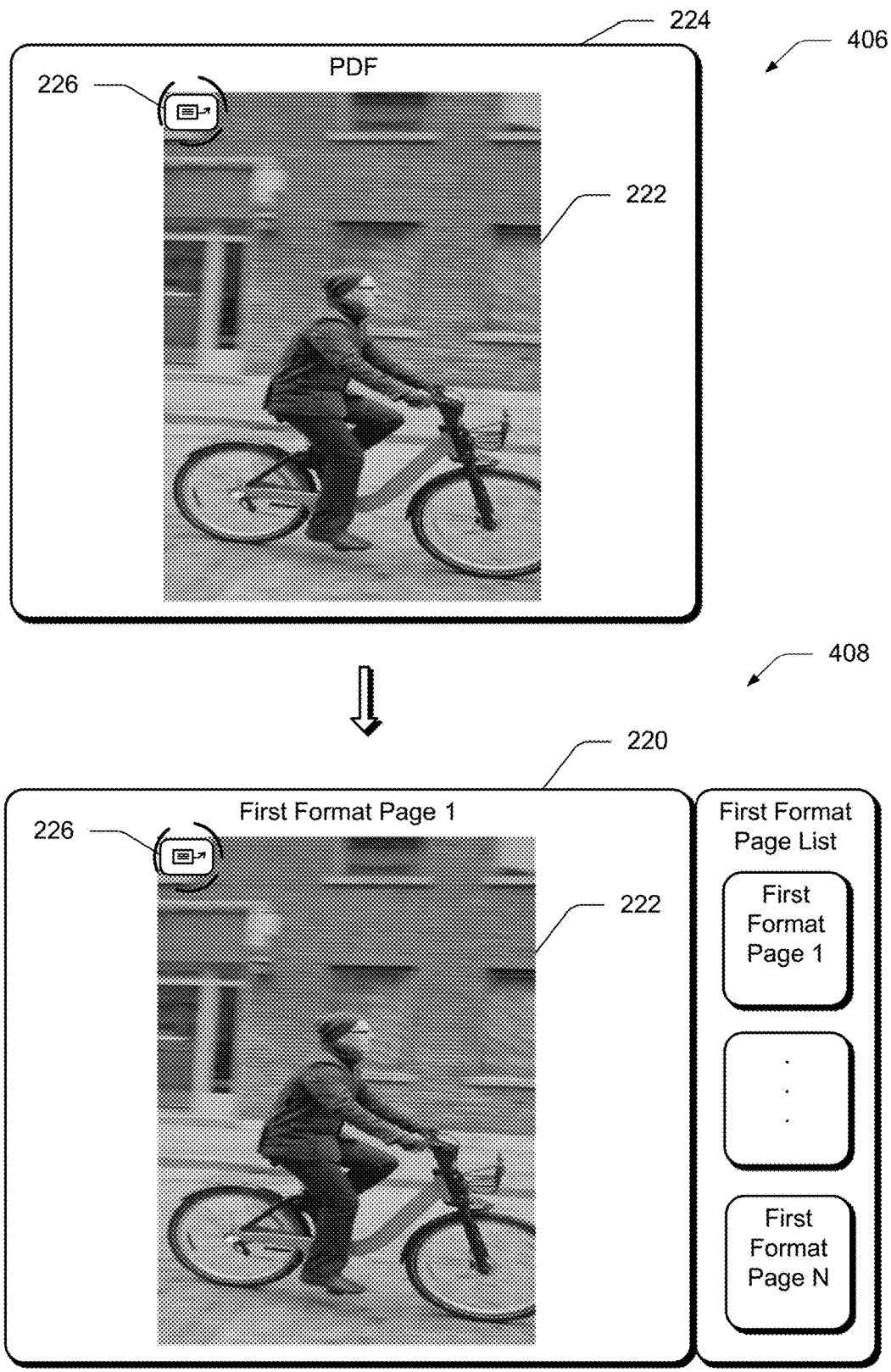
FIG. 4C depicts conversion of the digital document that includes the annotation associated with the object from the second format to the first format.

From this, at fourth stage 408, conversion module 202 converts second format digital document 224 with object 222 and its associated annotation 226 into first format digital document 220 (708), as depicted in FIG. 4C. Upon conversion of second format digital document 224 into first format digital document 220, both the object 222 and the associated annotation 226 appears on the page (i.e. page 1) of first format digital document 220 upon which the object was originally generated. The mapping of the annotation onto the appropriate page within first format digital document 220, and then with the appropriate object with which the annotation is associated, is implemented by importation module 208 in digital content generation system 104 in the operations described below.

Upon conversion of second format digital document 224 received from additional computing device 304, the importation module 208 identifies a second document identifier associated with the received second format digital document 224 (with the included annotation) and compares this document identifier with the original document identifier (i.e. first format document identifier) that was exported as part of the predefined key. If the importation module 208 determines that the document identifiers match, then the digital content generation system is able to confirm that the second format digital document 224, e.g. a PDF document, that was transmitted earlier is the digital document that was edited and subsequently received by content reception module 206.

Next, in order to ensure that the annotation included as part of second format digital document 224 is mapped onto the correct page within first format digital document 220, importation module 208 utilizes two types of data—(1) coordinate data that identifies a location of the annotation within second format digital document 224, and (2) width measurements included in the page width array exported as part of the predefined key. It is contemplated that a copy of the predefined key may be stored within the computing device 102 after the second format digital document 224, which includes the predefined key, is transmitted to the additional computing device 304, or may be received from the additional computing device 304 along with second format digital document 224.

Specifically, the importation module 208 maps the coordinate data of the annotation as included in the second format digital document 224 onto a corresponding coordinate data with a coordinate space of the first format digital document 220. To do so, the importation module 208 sums the width measurements included in the page width array—data that describes the width values of each page that makes up the first format digital document 220—and compares the summed width values to the coordinate data of the annotation as included in the second format digital document 224 to determine whether the comparison satisfies a threshold level or if there is overlap between the summed width values and the coordinate data. If overlap exists, the annotation is assigned to that particular page of the first format digital document 220. In this way, the annotation is mapped onto a coordinate space (defined by corresponding coordinate data) of the first format digital document 220, which indicates or identifies the page within first format digital document 220 on which the annotation should be located. If no overlap exists, the annotation is associated with an unmapped page section.

Having determined the appropriate page within first format digital document 220 upon which the annotation is to be mapped, the importation module 208 now determines the appropriate object on the page within first format digital document 220 upon which the annotation is to be mapped. The techniques employed by the importation module 208 vary depending on the type of annotation included in second format digital document 224. While various types of annotations are contemplated and supported by the digital content generation system 104 described herein, the techniques for mapping a select set of annotations—path comments and point comments—to objects are described.

For path comments, the importation module 208 compares a coordinate data value of the path comment (received from second format digital document 224) as part of the coordinate space of first format digital document 220—the location on a particular page of the first format digital document 220 upon which the path comment is to be mapped—with the coordinate data values of all objects within the coordinate space that are included on this particular page. While comparing, the importation module 208 identifies coordinate data values of objects, e.g. candidate objects, within the coordinate space that overlap with the coordinate data value of the path comment in the coordinate space. If a candidate object's coordinate data value satisfies a threshold overlap percentage, such as 80 percent, the importation module 208 determines that the candidate object is most likely the object associated with the path comment. Furthermore, in the event that multiple candidate objects satisfy the threshold percentage, the importation module 208 identifies a hierarchical order associated with all candidate objects that satisfy the threshold and determines the object at the highest level of the hierarchical order as the object most likely associated with the path comment.

For point comments, importation module 208 expands a coordinate data value of the point comment within the coordinate space of the first format digital document 220—the coordinate data value defines the location on a particular page of the first format digital document 220 upon which the annotation is to be mapped. The importation module 208 then compares the expanded coordinate data values of the point comment with the coordinate values of all of the objects that are included on the same page on which the point comment is located. The purpose of this comparison is to identify one or more objects with coordinate data values that overlap with the expanded coordinate data values. Upon identifying one or more objects with coordinate values that do overlap with the expanded coordinate values of the point comment, the importation module 208 identifies a hierarchical order associated with the identified objects. Then, the importation module 208 determines an object at the highest level of the hierarchical order as the object most likely associated with the point comment. In the event that multiple objects are determined to be located at the highest level of the hierarchical order, the importation module 208 selects the object that has the closest proximity to the point comment as the object that is most likely associated with the point comment In this way, both path comments and point comments, e.g. different types of annotations, are (1) mapped onto an appropriate page within the first format digital document 220 and (2) accurately associated with the object upon which the comment was included in the second format digital document 224, depicted in third stage 406. In example operation 400, the annotation is a path comment.

Figure 4D:
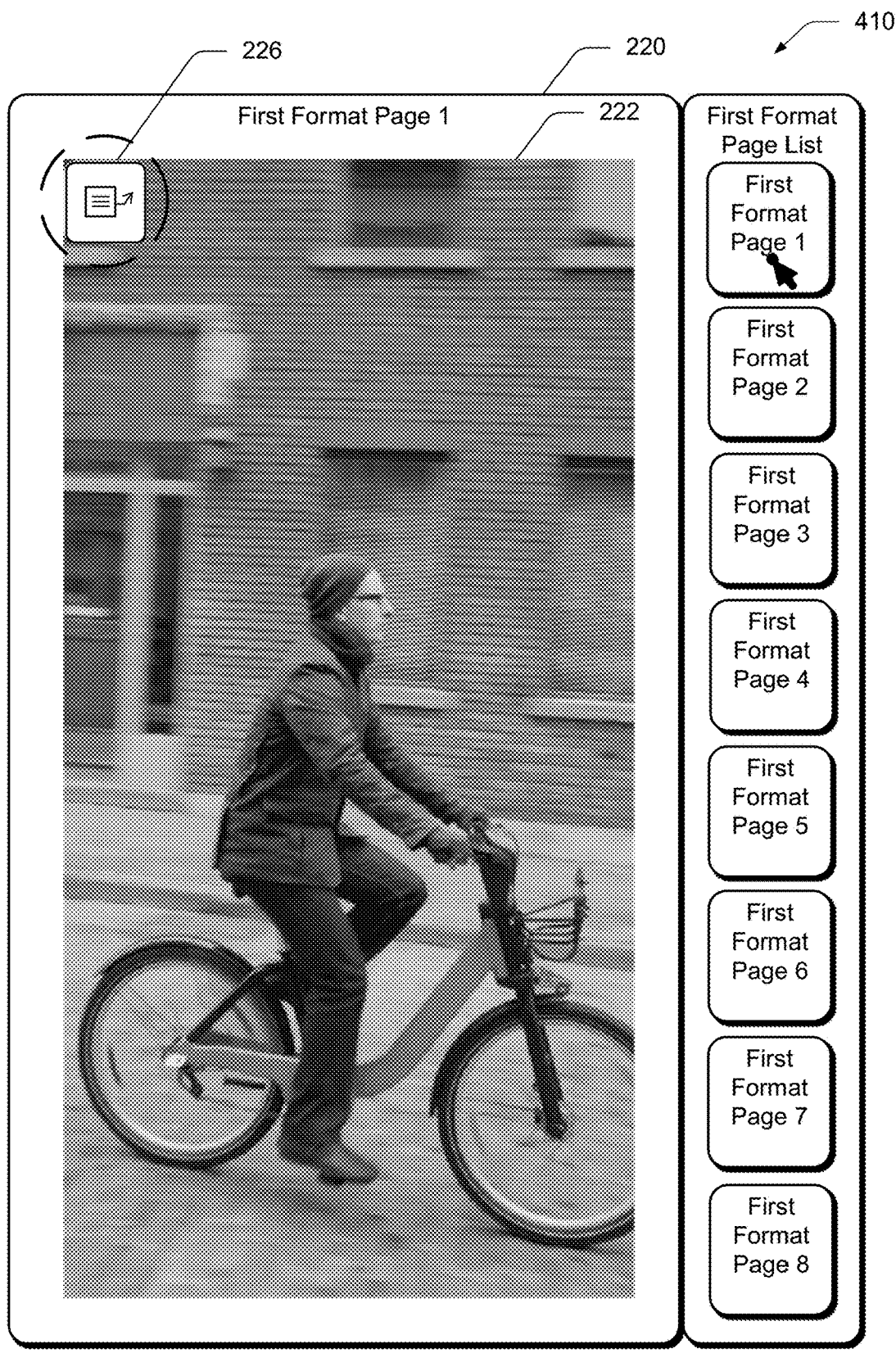
FIG. 4D depicts importation of the annotation associated with the object onto an appropriate page of the digital document in the first format. For example, the object with its associated annotation appears on page 1 of the digital document in the first format. The page sequence of the entire digital document in the first format is also depicted.
Figure 4E:
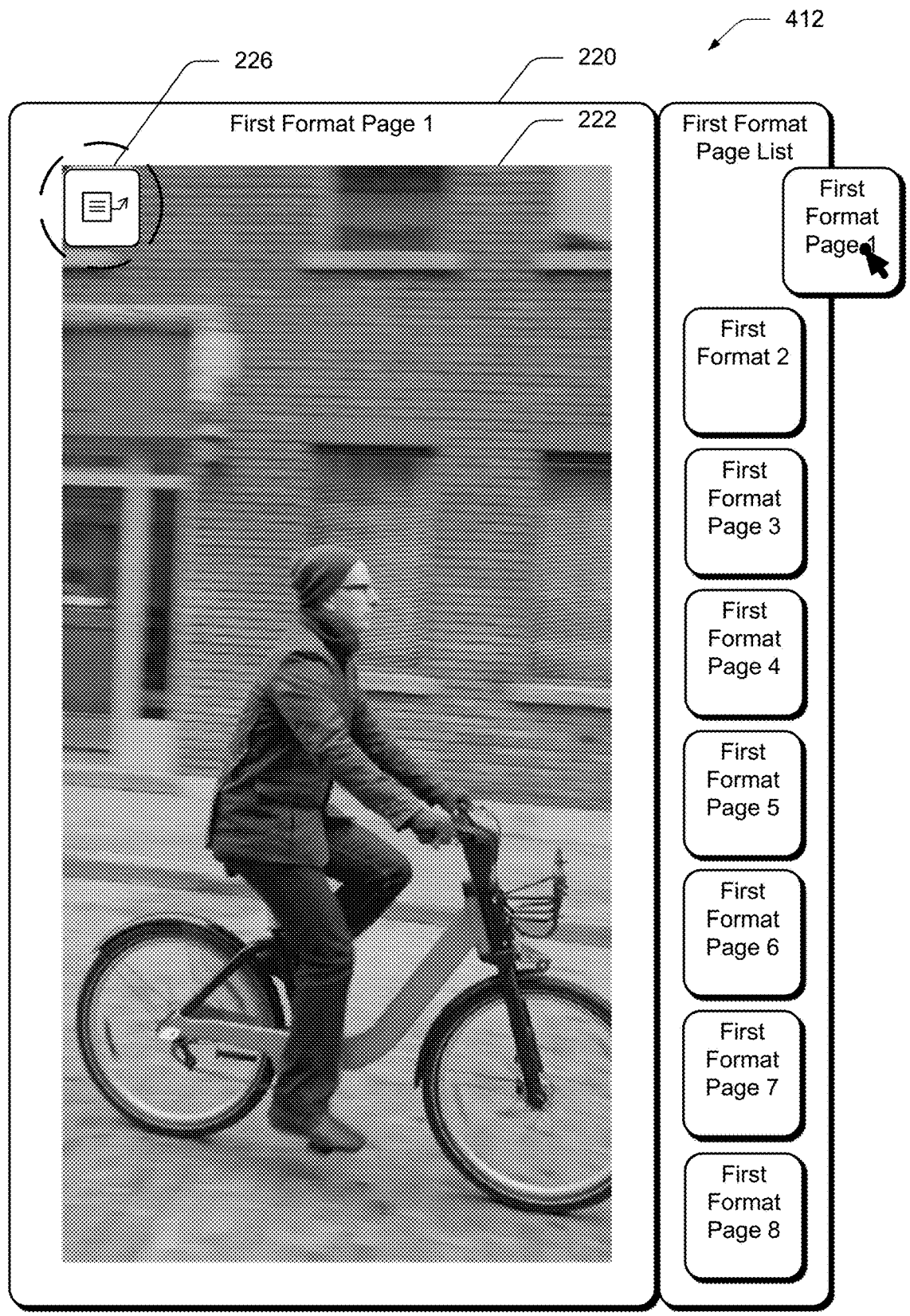
FIG. 4E depicts movement of page 1 of the digital document in the first format on which the object and its associated annotation are located. In other words, the page sequence of the digital document is changed.
Figure 47:
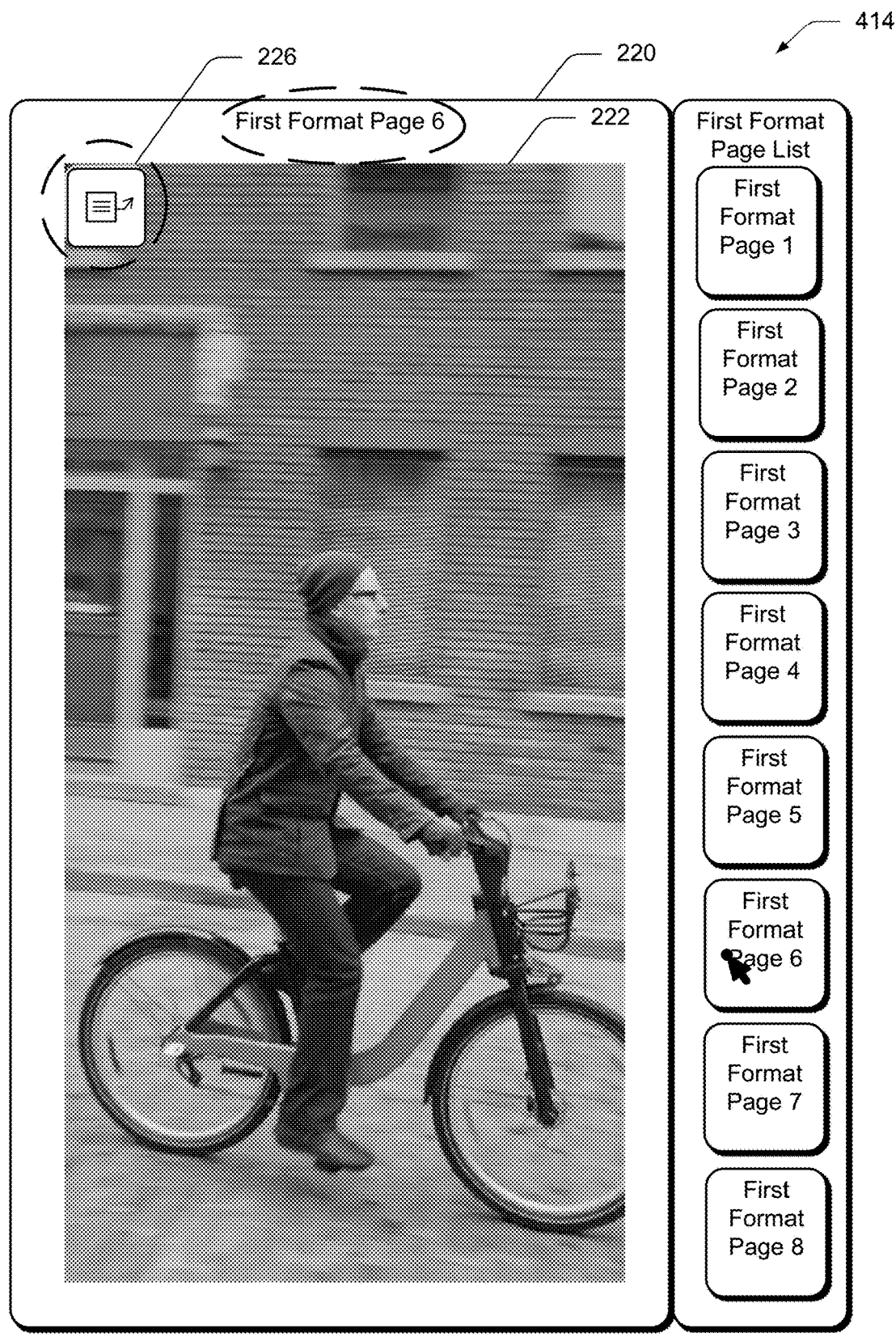

At fifth stage 410, sixth stage 412, and seventh stage 414, depicted in FIGS. 4D, 4E, and 4F, a document editing module 212 receives a user input moving the object to a modified location in the first format digital document 220 (block 710). As depicted in FIG. 4D, the document editing module 212 may receive a user input 214 via interaction with user interface 216 through, cursor control device, gestures, and so forth. An arrow shaped cursor is used to select first format page 1, a page on which the object and its associated annotation are located, and move the page to first format page 6. In this way, the page sequence of first format document 220 is altered. Despite the alteration, deep linking module 210 maintains the association between object 222 and annotation 226 (block 712). In other words, in FIG. 4F, annotation 226 appears at the top-left portion of object 222 on first format page 6—identical to the location of the object and the annotation on first format page 1, as depicted in FIG. 4D. Then, output module 218 outputs the object and its association annotation at the modified location (block 714)—first format page 6—as depicted in FIG. 4F.

As stated, deep linking module 210 maintains the association between object 222 and annotation 226 even if the page on which object 222 and annotation 226 are located is moved. The deep linking module 210 achieves this by, e.g. tracking the movement of the page first format digital document 220 upon which object 222 and annotation 226 are located within the coordinate space of the first format digital document and mapping the object 222 and annotation 226 back onto the page's changed location. For example, each page of first format digital document 220 might have its own specific coordinate values within the coordinate space. And a change in a page's location, e.g. first format page 1 being moved to first format page 6, results in a change in the page's coordinate value. The coordinate data values of the object 222 and annotation 226 having been used to map the object 222 and annotation 226 onto the correct location within first format digital document 220—first format page 1—are used once more to map them onto first format page 6.

Deep linking module 210 also stores a persisting identifier associated with every annotation and an object identifier associated with every object. Every object and its associated annotation in a given page of a first format digital document 220 are paired such that an annotation's persisting identifier is paired with a respective object identifier within that page. The persisting identifier and object identifier are also paired with the page upon which they are located. These pairings or relationships are stored within a persisting identifier and object identifier list, which may be stored as part of document metadata, stored within a storage device of computing device 102, and so forth.

FIGS. 5A-5E depicts another example operation 500 of digital content generation system being performed by the modules depicted in FIGS. 2 and 3. Example operation 500 is shown in first, second, third, fourth, fifth, and sixth stages 502, 504, 506, 508, 510, and 512, as applicable to FIGS. 5A-5E. At first stage 502, a first format digital document 220 with objects 222 and 514 are depicted on first format page 1 (514) of the digital document. Both objects are images, one depicting a building in the background and trees in the foreground, and another depicting several exercise bikes. At second stage 504, conversion module 202 of digital content generation system 104 converts the first format digital document 220 with objects 222 and 514 into second format digital document 224 with objects 222 and 514, e.g. a PDF format. Then, content transmission module 204 transmits the second format digital document 224 to an additional computing device 304, as depicted in FIG. 3.

As in the example operation of digital content generation system 104 described in FIGS. 4A-4F, second format digital document 224 includes various numeric identifiers exported as part of a predefined key. This predefined key, in this instance, includes metadata associated with both the first format digital document 220 and second format digital document 220. Specifically, the predefined key includes an original document identifier (first format document identifier) that identifies first format digital document 220, and a page identifier array that includes page identifiers defining each page within the second format digital document. These pages within second format digital document may correspond with either one or multiple pages of the first format digital document. Finally, the key includes a page width array identifying the width measurements of each first format digital document page.

Figure 5A:
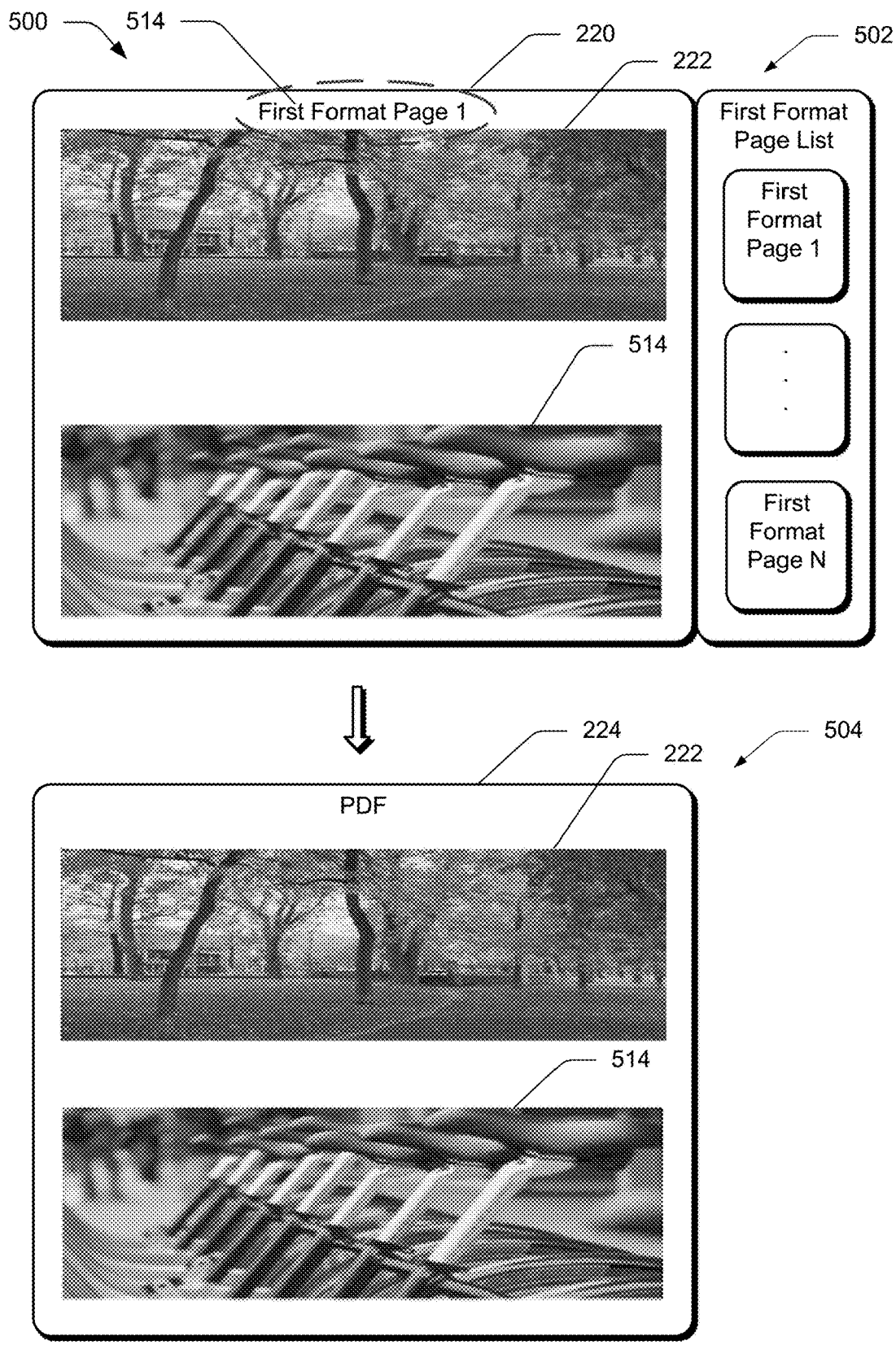
FIG. 5A depicts the digital content generation system converting, using a computing device, a digital document including two objects, e.g. an image of a building in the background and several trees on a lawn in the foreground another image with several exercise bikes, from a first format to a second format, e.g. PDF format. The converted digital document is then transmitted to an additional computing device.
Figure 5B:
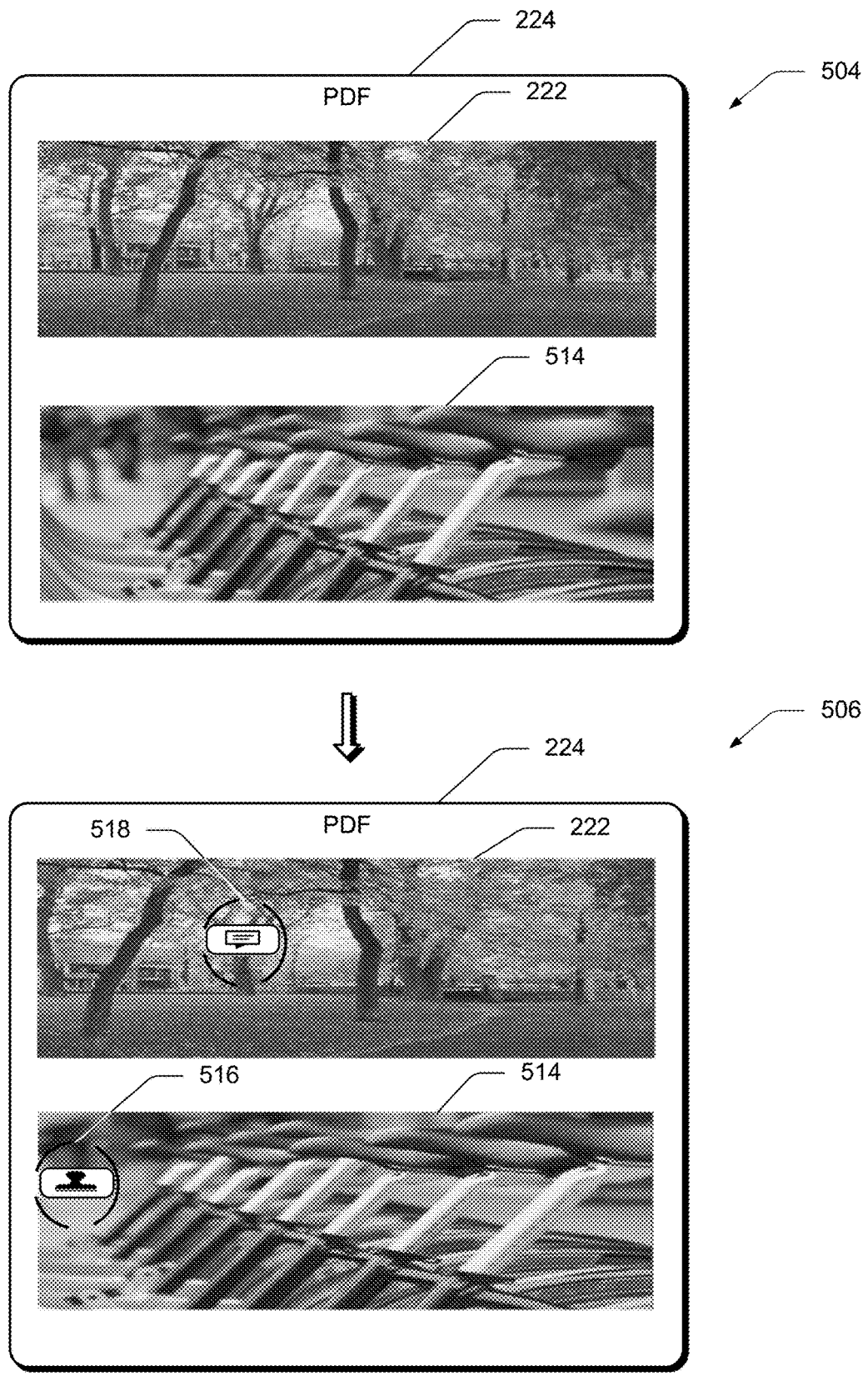
FIG. 5B depicts the inclusion of annotations associated with the two objects in the digital document in the second format. The center of the image of the building in the background with trees on a lawn in the foreground contains an annotation over one of the trees, and the image with several exercise bikes contains an annotation towards the left portion of the image.
Figure 5C:
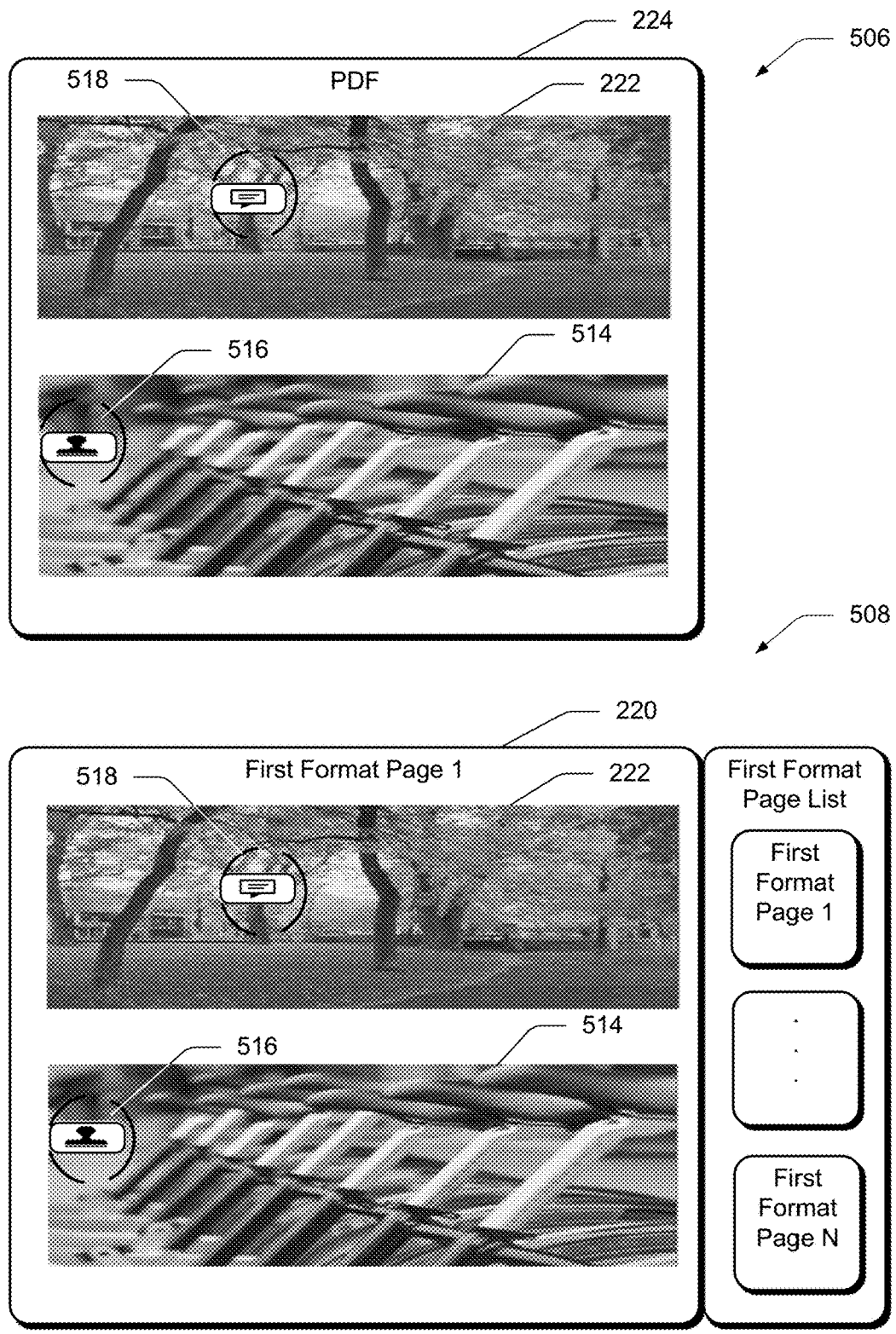
FIG. 5C depicts conversion of the digital document that includes the annotations associated with two objects from the second format to the first format.

Thereafter, at third stage 506, annotations 518 and 516 are added to objects 222 and 514 respectively, in second format digital document 224 using additional computing device 304. From this, at fourth stage 508, conversion module 202 converts second format digital document 224 with object 222 and 514, and their associated annotations 518 and 516 back into first format digital document 220, as depicted in FIG. 5C. Just as in example 400, after conversion of second format digital document 224 into first format digital document 220, both the objects 222 and 514 and the associated annotations 518 and 516 are (1) mapped onto the appropriate pages within the first format digital document 220 and (2) associated with one another appropriately. The mapping of the annotations onto the appropriate page, is implemented by importation module 208 in a manner that is described in detail above. Similar to operation 400, operation 500 includes annotations that are path comments.

Figure 5D:
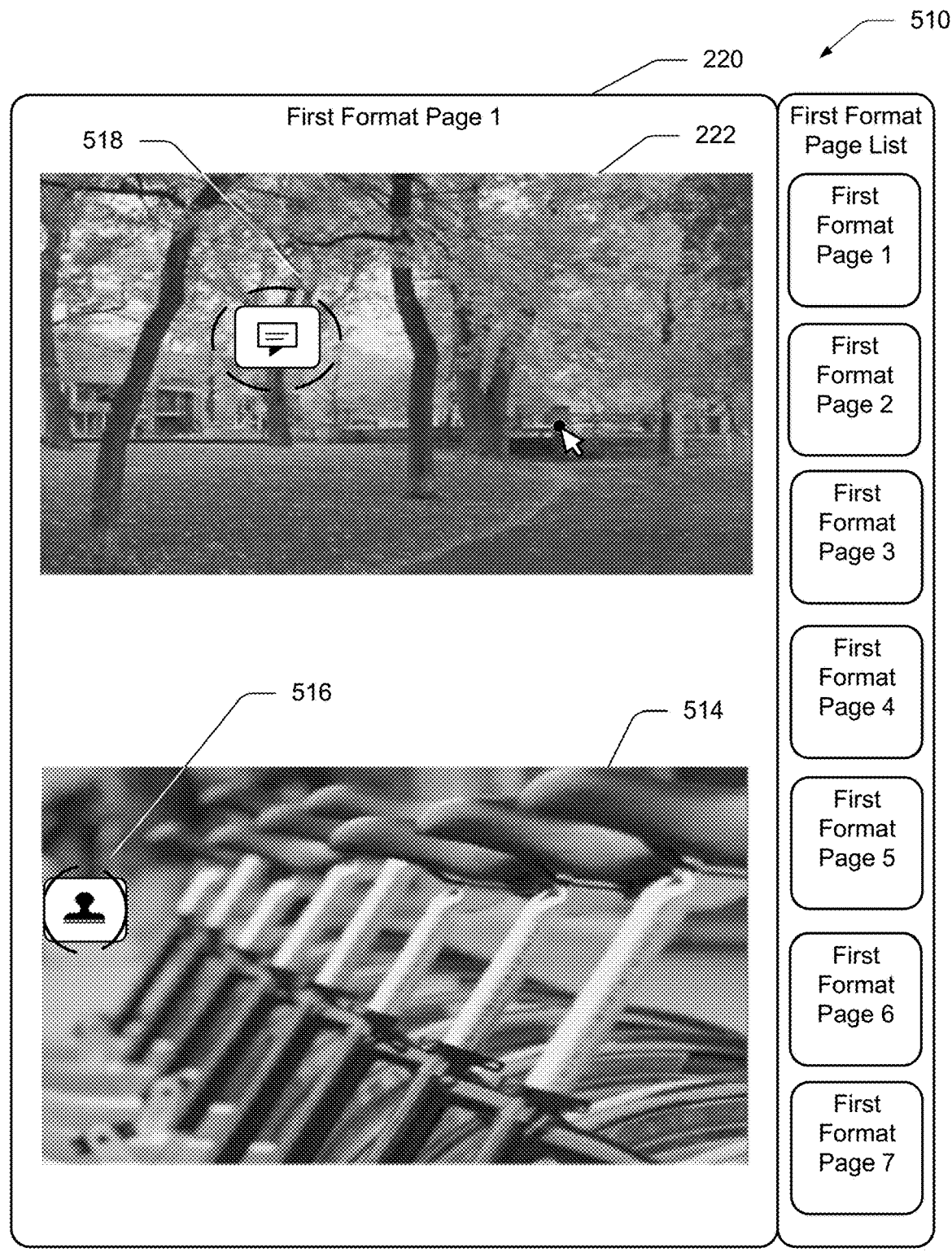
FIG. 5D depicts importation of the objects and the associated annotations onto an appropriate page of the digital document in the first format. For example, the two objects with the associated annotations appear on page 1 of the digital document in the first format. The page sequence of the entire digital document is also depicted.
Figure 5E:
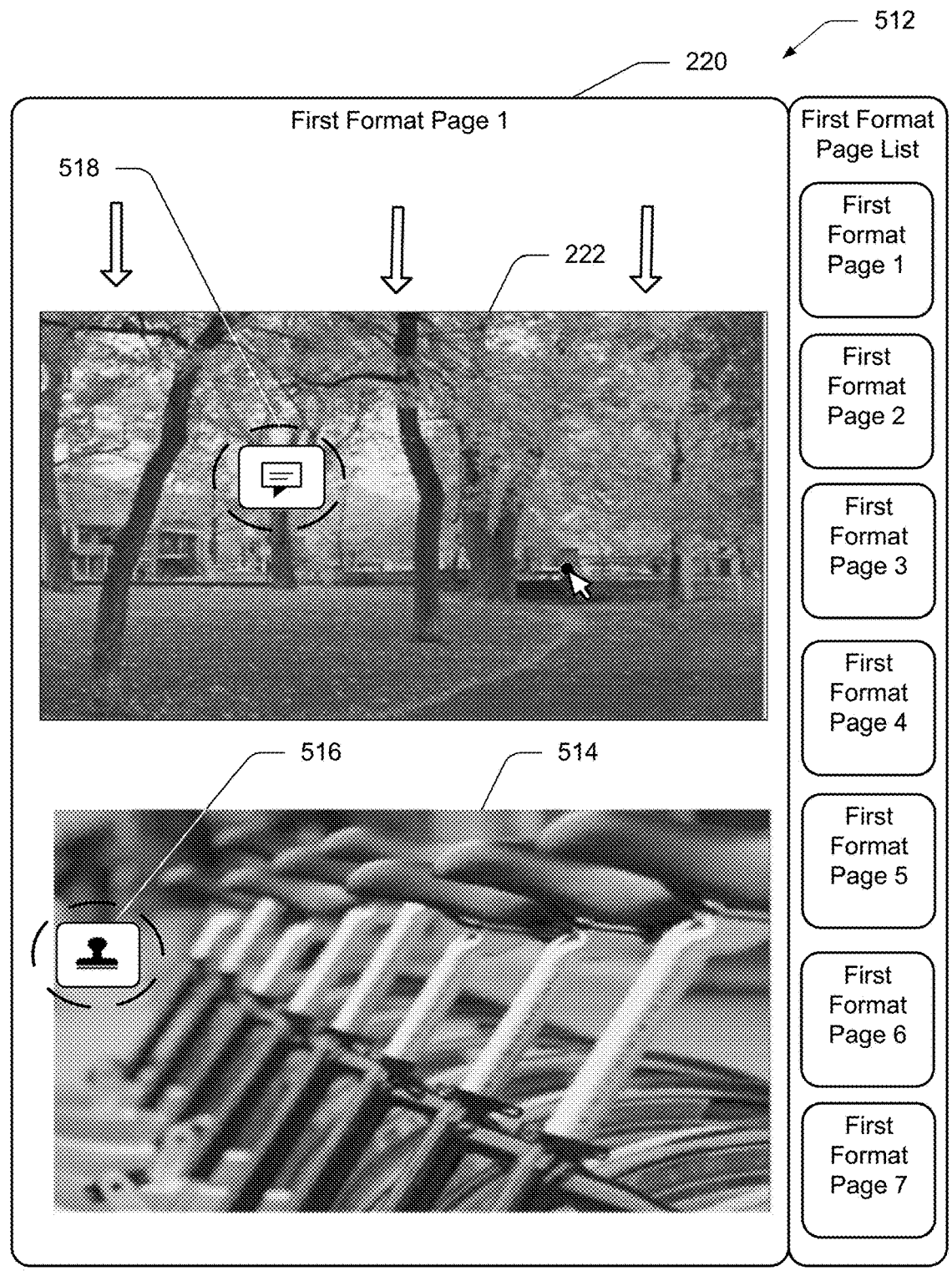
FIG. 5E depicts the result of moving an object on first format page 1 of the digital document within first format page 1. As depicted, the association between the object and the annotation is maintained after the object is moved downwards on first format page 1.

At fifth stage 510, and sixth stage 512, depicted in FIGS. 5D and 5E, a document editing module 212 receives a user input moving the object to a modified location in the first format digital document 220. Specifically, as shown in FIG. 5E, the document editing module 212 may receive a user input 214 via interaction with user interface 216 through, cursor control device, gestures, and so forth. An arrow shaped cursor is used to select object 222, which is subsequently moved downwards on first format page 1. Despite the movement, deep linking module 210 maintains the association between object 222 and annotation 518. In other words, in FIG. 5E, annotation 518 appears at the same location on object 222 as in FIG. 5C. Finally, output module 218 outputs object 222 and its associated annotation 518 at the modified location in the center of first format page 1 as depicted in FIG. 5E. As stated above, annotations and objects are assigned persisting identifiers and object identifiers respectively, which pair the objects and annotations with each other and with a page in the first format digital document 220. Moreover these pairings are stored within a persisting identifier and object identifier list, which may be stored as part of document level metadata, located in a storage device of computing device 102, and so forth. These annotations and objects also have coordinate data values that change when the objects are moved. If, for example, an object is moved by, e.g. 5 coordinate data value units in a certain direction, the annotation is also moved by the 5 coordinate data value units in the same direction.

Figure 6A:
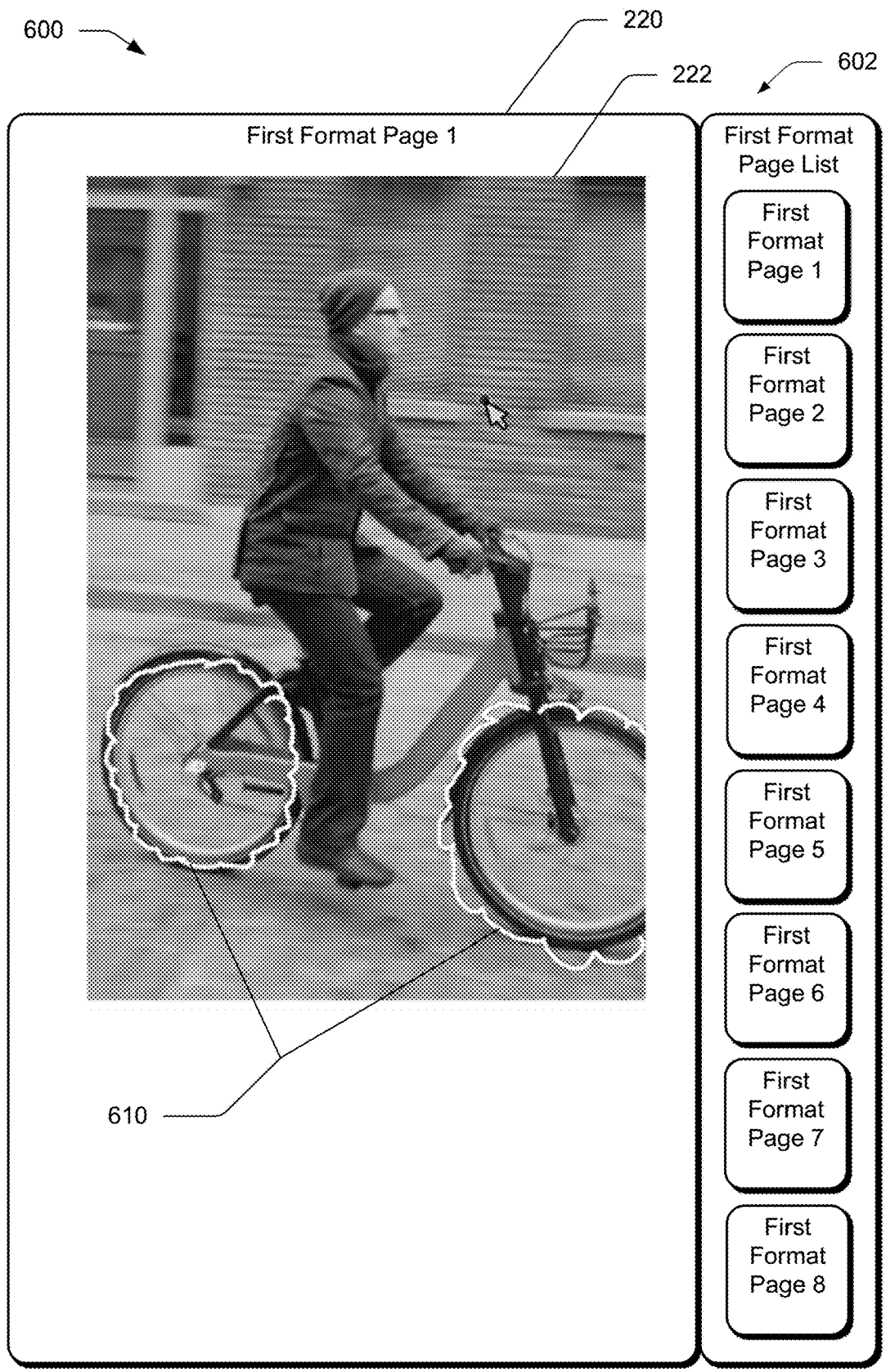
FIG. 6A depicts the digital content generation system receiving a user input selecting the object on page 1 of the digital document in the first format. The object, in this instance, includes freeform diagram based annotation.
Figure 6B:
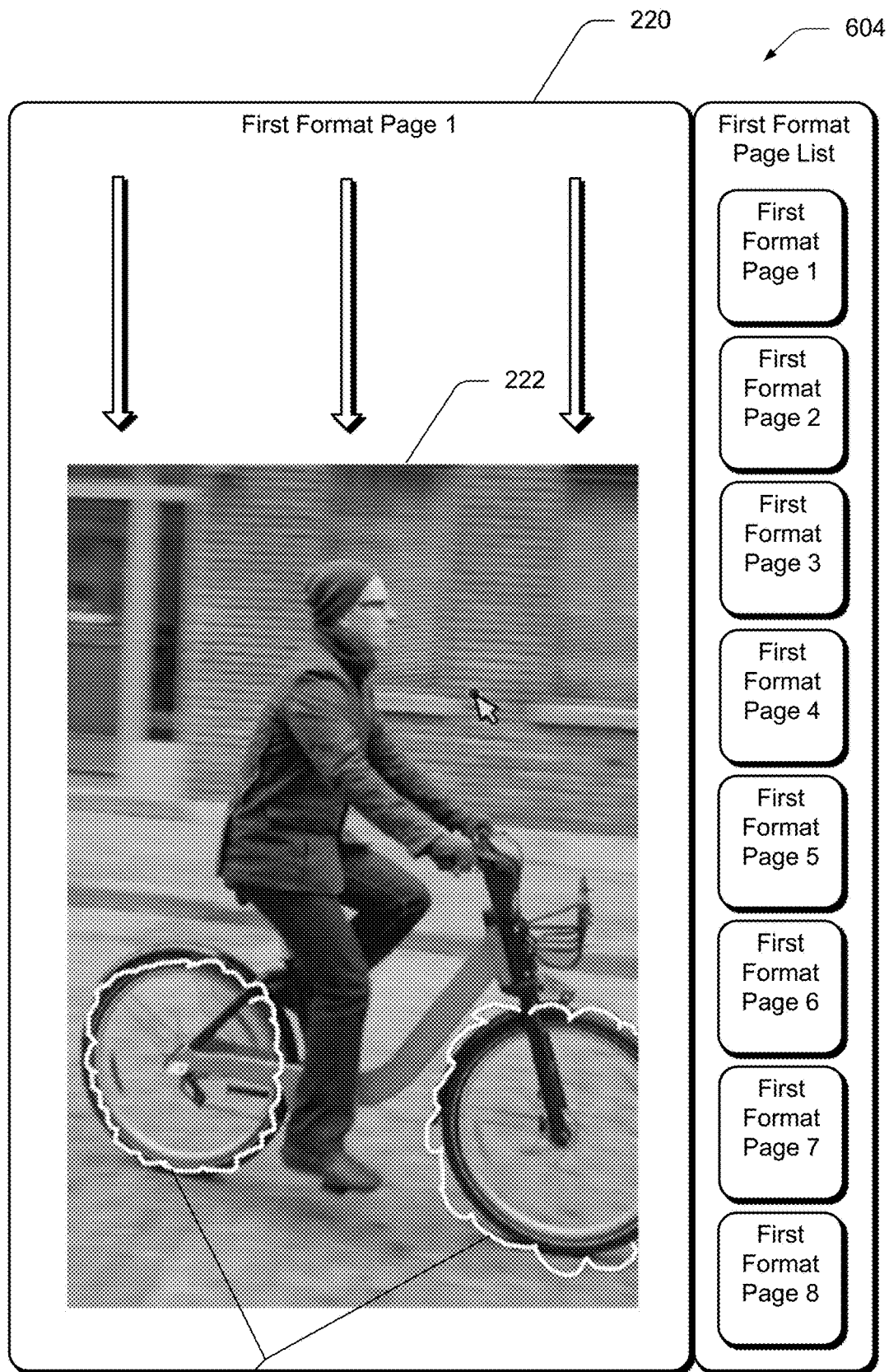
FIG. 6B depicts the result of moving the object within first format page 1. As depicted, the association between the object and the freeform diagram based annotation is maintained after the object is moved downwards within first format page 1.

FIGS. 6A and 6B depict example operation 600 of digital content generation system being performed by the modules depicted in FIGS. 2 and 3. Example operation 600 is shown in first and second stages 602 and 604 as applicable to FIGS. 6A and 6B. Operation 600 describes the final operations of the digital annotation and digital content linking techniques described in FIGS. 4A-4F and 5A-5E, as applicable to free-form annotations, a feature that is not imported from one document format to another using conventional digital content generation systems. While the final operations of the processes implemented by digital content generation system 104 are discussed, all pertinent operations performed in FIGS. 4A-4F and/or 5A-5E are likewise performed in example operation 600.

At stage 602, the document editing module 212 may receive a user input 214 via interaction with user interface 216 through, cursor control device, gestures, and so forth. An arrow shaped cursor is used to select object 222 in first format page 1 of first format digital document 220. Object 222 is subsequently moved downwards on first format page 1. Despite the movement, deep linking module 210 maintains the association between object 222 and annotations 610. In other words, annotations 610 appear over the same portion of object 222—over the bicycle tires—as depicted in FIG. 6B. Finally, output module 218 outputs object 222 and its associated annotations 610 at the modified location—in the center of first format page 1—as depicted in FIG. 6B. The deep linking module 210 maintains the association between object 608 and annotation using the steps and processes described with respect to FIGS. 5A-5E. Specifically, annotation 610 and object 222 also has coordinate data values that change when either the object 222 or the annotation 610 is moved. For example, if object is moved by, e.g. 5 coordinate data value units in a certain direction, the annotation is also moved by the 5 coordinate data value units in the same direction.

In this way, the digital content generation system 104 described herein overcomes the drawbacks present in conventional systems by (1) accurately mapping an object and its associated annotation onto an appropriate page within a digital document after the document's file format has been converted from one format to another, (2) linking annotations with objects within a digital document such that the object-annotation link is maintained even after alteration in the digital document's page sequence or a movement of the object within a page in the document, and (3) supporting a wide range of annotation styles, including, e.g. freeform based annotations, that enables content reviewers to easily and effectively convey recommendations to content creators. Although movement of pages and objects is discussed herein, it should be noted that the linking of objects and annotations allows a change made to an annotation if an object is deleted. For example, if the user deletes the object, the deep linking module 210 can delete the annotation associated with the object.

Example System and Device

Figure 8:
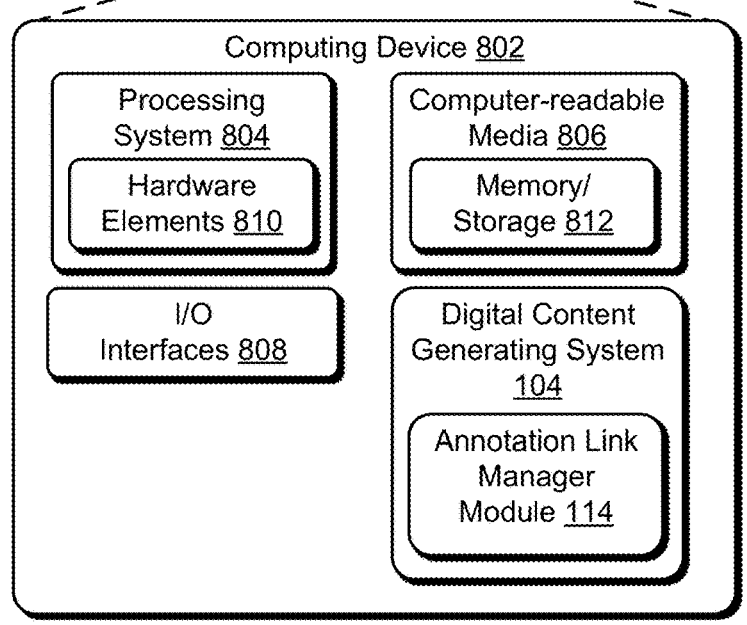
FIG. 8 illustrates an example system including various components of an example device that can be implemented at any time by the computing device as described and/or utilized with references to FIGS. 1-7 to implement examples of the techniques described herein.

FIG. 8 illustrates an example system generally at 800 that includes an example computing device 802 that is representative of one or more computing systems and/or devices that may implement the various techniques described herein. This is illustrated through inclusion of the digital content generating system 104 and annotation link manager module 114. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 818 via a platform 814 as described below.

The cloud 818 includes and/or is representative of a platform 814 for resources 816. The platform 814 abstracts underlying functionality of hardware (e.g., servers) and software resources of the cloud 818. The resources 816 may include applications and/or data that can be utilized while computer processing is executed on servers that are remote from the computing device 802. Resources 816 can also include services provided over the Internet and/or through a subscriber network, such as a cellular or Wi-Fi network.

The platform 814 may abstract resources and functions to connect the computing device 802 with other computing devices. The platform 814 may also serve to abstract scaling of resources to provide a corresponding level of scale to encountered demand for the resources 816 that are implemented via the platform 814. Accordingly, in an interconnected device embodiment, implementation of functionality described herein may be distributed throughout the system 800. For example, the functionality may be implemented in part on the computing device 802 as well as via the platform 814 that abstracts the functionality of the cloud 818.

The invention claimed is:

1. In a digital content generating environment, a method, implemented by a computing device, of associating an annotation with an object in a digital document, the method comprising:
   converting, using a computing device, the digital document from a first format to a second format, the digital document including the object;
   transmitting, using the computing device, the digital document in the second format to an additional computing device;
   receiving, using the computing device, the digital document in the second format from the addition computing device, the digital document including an annotation associated with the object;
   converting, using the computing device, the digital document with the annotation from the second format to the first format;
   importing the annotation from the digital document in the second format, wherein the annotation is a path comment, the importing including:
      identifying multiple candidate objects, rather than other annotations, in the digital document in the first format that overlap the annotation;
      determining that two or more of the multiple candidate objects overlap the annotation by an amount that satisfies a threshold;
      identifying a hierarchical order associated with the two or more candidate objects;
      determining a single candidate object from the two or more candidate objects at a highest level in the hierarchical order; and
      associating the annotation with the single candidate object at the highest level in the hierarchical order that overlaps the annotation by the amount that satisfies the threshold;
   receiving, using the computing device, a user input moving the object to a modified location in the digital document in the first format;
   maintaining, by the computing device, the association between the annotation and the object in the digital document in the first format; and
   outputting, by the computing device, the object and the associated annotation at the modified location.

2. The method as described in claim 1, wherein the path comment is based on a free-form shape, a line segment, a polygon, or text box.

3. The method as described in claim 1, wherein the user input moving the object to a modified location comprises:
changing a sequence of a page from multiple pages included in the digital document, the page including the object and the associated annotation.

4. The method as described in claim 1, wherein the user input moving the object to a modified location comprises:
changing a location of the object located on a page in the digital document.

5. The method as described in claim 1, further comprising:
assigning a persisting identifier to the annotation, the persisting identifier being based on the first format.

6. The method as described in claim 1, wherein the second format is a PDF format.

7. The method as described in claim 1, wherein the object in the digital document includes text, digital images, or digital content that comprises one or more shapes and configurations.

8. The method as described in claim 1, the object comprising one or more of an image, a shape, and a color in the digital document, the annotation comprising a digital input that appears on or near the object.

9. The method as described in claim 1, the importing further including:
determining a summed width of pages in the digital document in the first format;
determining whether there is overlap between the summed width and coordinate data of the annotation from the digital document in the second format; and
in response to determining there is no overlap between the summed width and the coordinate data of the annotation from the digital document in the second format, associating the annotation with an unmapped page section.

10. In a digital content generating environment, a system of associating an annotation with an object in digital content, the system comprising:
a conversion module implemented at least partially in hardware of a computing device to convert a digital document from a first format to a second format, the digital content including the object;
a content transmission module implemented at least partially in hardware of the computing device to transmit the digital document in the second format;
a content reception module implemented at least partially in hardware of the computing device to receive the digital document in the second format with the annotation, the annotation being associated with the object included in the digital document;
the conversion module configured to convert the digital document in the second format that includes the annotation into the first format;
an importation module implemented at least partially in hardware of the computing device to import the annotation from the digital document in the second format into the digital document in the first format, wherein the annotation is a point comment and the importation module imports the annotation by:
identifying coordinate data defining the annotation in the digital document in the second format;
mapping the coordinate data defining the point comment in the second format with corresponding coordinate data in the digital document in the first format;
identifying multiple objects, rather than other annotations, in the digital document in the first format that overlap the annotation;
identifying a hierarchical order associated with the multiple objects;
determining a candidate object from the multiple objects at a highest level in the hierarchical order; and
identifying the candidate object at the highest level in the hierarchical order as the object associated with the point comment;
a document editing module implemented at least partially in hardware of the computing device to receive a user input moving the object to a modified location in the digital document in the first format; and
a deep linking module implemented at least partially in hardware of the computing device to maintain the association between the annotation and the object.

11. The system as described in claim 10, wherein
the conversion module stores a first format document identifier associated with the digital document in the first format upon converting the digital document from the first format to the second format;
the importation module imports the annotation by:
comparing the first format document identifier stored by the conversion module with a second format document identifier associated with the digital document in the second format; and
mapping the annotation from the digital document in the second format to the digital document in the first format if the first format document identifier matches the second format document identifier.

12. The system as described in claim 10, wherein the annotation is a text comment, a path comment, or a point comment.

13. The system as described in claim 12, wherein the importation module imports the path comment by:
identifying coordinate data associated with the path comment included in the digital document in the second format; and
mapping the coordinate data of the path comment in the digital document in the second format with corresponding coordinate data in the digital document in the first format.

14. The system as described in claim 13, further comprising the importation module identifying, as the multiple objects, two or more objects that satisfy a threshold.

15. The system as described in claim 12, wherein the importation module imports the point comment by:
identifying coordinate data defining the point comment in the digital document in the second format;
mapping the coordinate data defining the point comment in the second format with corresponding coordinate data in the digital document in the first format; and
expanding the corresponding coordinate data in the first format of the digital document; and
using the expanded coordinate data as the corresponding coordinate data in the digital document in the first format.

16. The system as described in claim 10, further comprising the deep linking module assigning a persisting identifier to the annotation, the persistent identifier defining the association between the object and the annotation and the annotation and a page of the digital document.

17. In a digital content generating environment, a computing device comprising:
a processor; and computer-readable storage media having stored thereon multiple instructions that, responsive to execution by the processor, cause the processor to perform operations comprising:
  converting a digital document from a first format to a second format, the digital document including an object;
  transmitting the digital document in the second format to an additional computing device;
  receiving the digital document in the second format, the digital document including an annotation associated with the object;
  converting the digital document with the annotation from the second format to the first format;
  importing the annotation from the digital document in the second format, wherein the annotation is a path comment, the importing including:
    identifying multiple candidate objects, rather than other annotations, in the digital document in the first format that overlap the annotation;
    determining that two or more of the multiple candidate objects overlap the annotation by an amount that satisfies a threshold;
    identifying a hierarchical order associated with the two or more candidate objects;
    determining a single candidate object from the two or more candidate objects at a highest level in the hierarchical order; and
    associating the annotation with the single candidate object at the highest level in the hierarchical order that overlaps the annotation by the amount that satisfies the threshold;
  receiving a user input moving the object to a modified location in the digital document in the first format;
  maintaining the association between the annotation and the object in the digital document in the first format; and
  outputting the object and the associated annotation at the modified location.

18. The computing device as described in claim 17, wherein the path comment is based on a free-form shape, a line segment, a polygon, or text box.

19. The computing device as described in claim 17, wherein the user input moving the object to a modified location comprises:
  changing a sequence of a page from multiple pages included in the digital document, the page including the object and the associated annotation.

20. The computing device as described in claim 17, wherein the user input moving the object to a modified location comprises:
  changing a location of the object located on a page in the digital document.

* * * * *